(12) United States Patent
Shenderova

(10) Patent No.: US 10,364,389 B1
(45) Date of Patent: Jul. 30, 2019

(54) FLUORESCENT DIAMOND PARTICLES

(71) Applicant: Adámas Nanotechnologies Inc., Raleigh, NC (US)

(72) Inventor: Olga Aleksandrovna Shenderova, Raleigh, NC (US)

(73) Assignee: Adámas Nanotechnologies, Inc., Raleigh, NC (US)

(*) Notice: Subject to any disclaimer, the term of this patent is extended or adjusted under 35 U.S.C. 154(b) by 437 days.

(21) Appl. No.: 14/484,905

(22) Filed: Sep. 12, 2014

Related U.S. Application Data

(60) Provisional application No. 61/876,907, filed on Sep. 12, 2013.

(51) Int. Cl.
   C09K 11/65     (2006.01)
   C09K 11/02     (2006.01)

(52) U.S. Cl.
   CPC ............ C09K 11/65 (2013.01); C09K 11/025 (2013.01)

(58) Field of Classification Search
   None
   See application file for complete search history.

(56) References Cited

U.S. PATENT DOCUMENTS 8,574,536 B2 * 11/2013 Boudou ............... C01B 31/065
                                                    423/446
8,961,920 B1 * 2/2015 Pope, II ................. C30B 29/04
                                                    117/3

OTHER PUBLICATIONS

Gour; Manufacturing Nano-Sized Powder using Sugar-Assisted Milling; Masters of Science in Biomedical Engineering, Drexel University; Mar. 2010.*
Beveratos, Alexios et al., "Nonclassical Radiation from Diamond Nanocrystals," Physical Review A, vol. 64, pp. 061802-1-061802-4, 2001.
Cabria, I. et al., "Interaction of Narrow Carbon Nanotubes with Nitronium Tetrafluoroborate Salts," The Journal of Chemical Physics 128, pp. 214703-1-214703-8, 2008.
Huang, L.. C. et al., "Absorption and Immobilization of Cytochrome c on Nanodiamonds," Langmuir 20, pp. 5879-5884, 2004.
Ray, S.C. et al., "Fluorescent Carbon Nanoparticles: Synthesis, Characterization and Bioimaging Application," Journal of Physical Chemistry C, 113, pp. 18546-18551, 2009.
Sun, Ya-Ping et al., "Doped Carbon Nanoparticles as a New Platform for Highly Photoluminescent Dots," The Journal of Physical Chemistry Letters 112, pp. 18295-18298. 2008.

(Continued)

*Primary Examiner* — Guinever S Gregorio
(74) *Attorney, Agent, or Firm* — James G. Passé; Passé Intellectual Property, LLC

(57) ABSTRACT

A method of processing diamond particles to form fluorescent color centers involves providing diamond particles containing at least one dopant; annealing the diamond particles in a vacuum or an inert atmosphere; creating vacancies in the annealed diamond particles by irradiating the diamond particles with high energy radiation; and while the annealed diamond particles are being irradiated, causing a temperature of the diamond particles to be at least a temperature at which vacancies in the diamond particles diffuse and combine with the at least one dopant to form fluorescent color centers. The procedure can be repeated at least twice. This abstract is not to be considered limiting, since other embodiments may deviate from the features described in this abstract.

35 Claims, 14 Drawing Sheets

(56) References Cited

OTHER PUBLICATIONS

Sun, Ya-Ping et al., "Quantum Sized Carbon Dots for Brights and Colorful Photoluminescence," Journal of American Chemical Society 128, pp. 7756-7757, 2006.

Wang, Xin et al., "Photoinduced Electron Transfers with Carbon Dots," Chemical Communication, pp. 3774-3776, 2009.

Xu, Xiaoyou et al., "Electrophoretic Analysis and Purification of Fluorescent Single-Walled Carbon Nanotube Fragments," Journal of American Chemical Society 126, pp. 12736-12737, 2004.

Yeap, Weng Siang et al., "Using Detonation Nanodiamond for the Specific Capture of Glycoproteins," Analytical Chemistry vol. 80, No. 12, pp. 4659-4665, 2008.

Yu, Shu-Jung et al., "Bright Fluorescent Nanodiamonds: No Photobleaching and Low Cytotoxicity," Journal of American Chemical Society 127, pp. 17604-17605, 2005.

Jelezko, F. et al., "Single Defect Centres in Diamond: A Review," Phys. Stat. Sol. (a) 203, No. 13, pp. 3207-3225, 2006.

Zhang, Gaixia et al., "The Surface Analytical Characterization of Carbon Fibers Functionalized by H2SO4/HNO3 Treatment," Science Direct, Carbon 46, pp. 196-205, 2008.

Ay et al, "The Physicochemical and Electrochemical Properties of 100 and 500 nm Diameter Diamond Powders Coated with Boron-Doped Nanocrystalline Diamond," Journal of the Electrochemical Society, 155 (10), pp. B1013-B1022, May 5, 2008.

Alexios Beveratos et al., "Nonclassical Radiation from Diamond Nanocrystals," Physical Review A, vol. 64, pp. 061802-1-061802-4, 2001.

Borjanovic, Vesna et al., "Effect of Proton Irradiation on Photoluminescent Properties of PDMS—Nanodiamond Composites," Nanotechnology 19, 2008.

Chang, Y.R. et al., "Mass Production and Dynamic Imaging of Fluorescent Nanodiamonds," Nature Nanotech. 3, pp. 284-288, 2008.

Boudou J.P. et al., "High Yield Fabrication of Fluorescent Nanodiamonds," Nanotechnology 20, 235602, 2009.

Long-Jyun Su, et al. "Creation of High Density Ensembles of Nitrogen NVacancy Centers in Nitrogen-Rich Type Lb Nanodiamonds," Nanotechnology 24, 315702, 2013.

Boudou J, et al., "Fluorescent Nanodiamonds Derived from HPHT with a Size of Less than 10nm," Diamond & Related Materials 37, pp. 80-86, 2013.

Leung Sarah J. et al., "Light-Activated Content Release from Liposomes," Theranostics 2012, 2 (10), 2010.

Pentecost Amanda et al., "Deaggregation of Nanodiamond Powders Using Salt- and Sugar-Assisted Milling," Applied Materials Interphases, vol. 2, 11, pp. 3289-3294, 2010.

Shenderova Olga et al., "Nitrogen Control in Nanodiamond Produced by Detonation Shock-Wave-Assisted Synthesis", The Journal of Physical Chemistry, C 2011, 115, 14014-14024, 2011.

Shenderova Olga et al., "Carbon Based Nanostructures: Diamond Clusters Structured with Nanotubes", Materials Research, vol. 66, No. 1, 11-17, 2002.

Biodiamond Specificationss from biodiamond.url.tw, date unknown, downloaded Sep. 11, 2014.

* cited by examiner

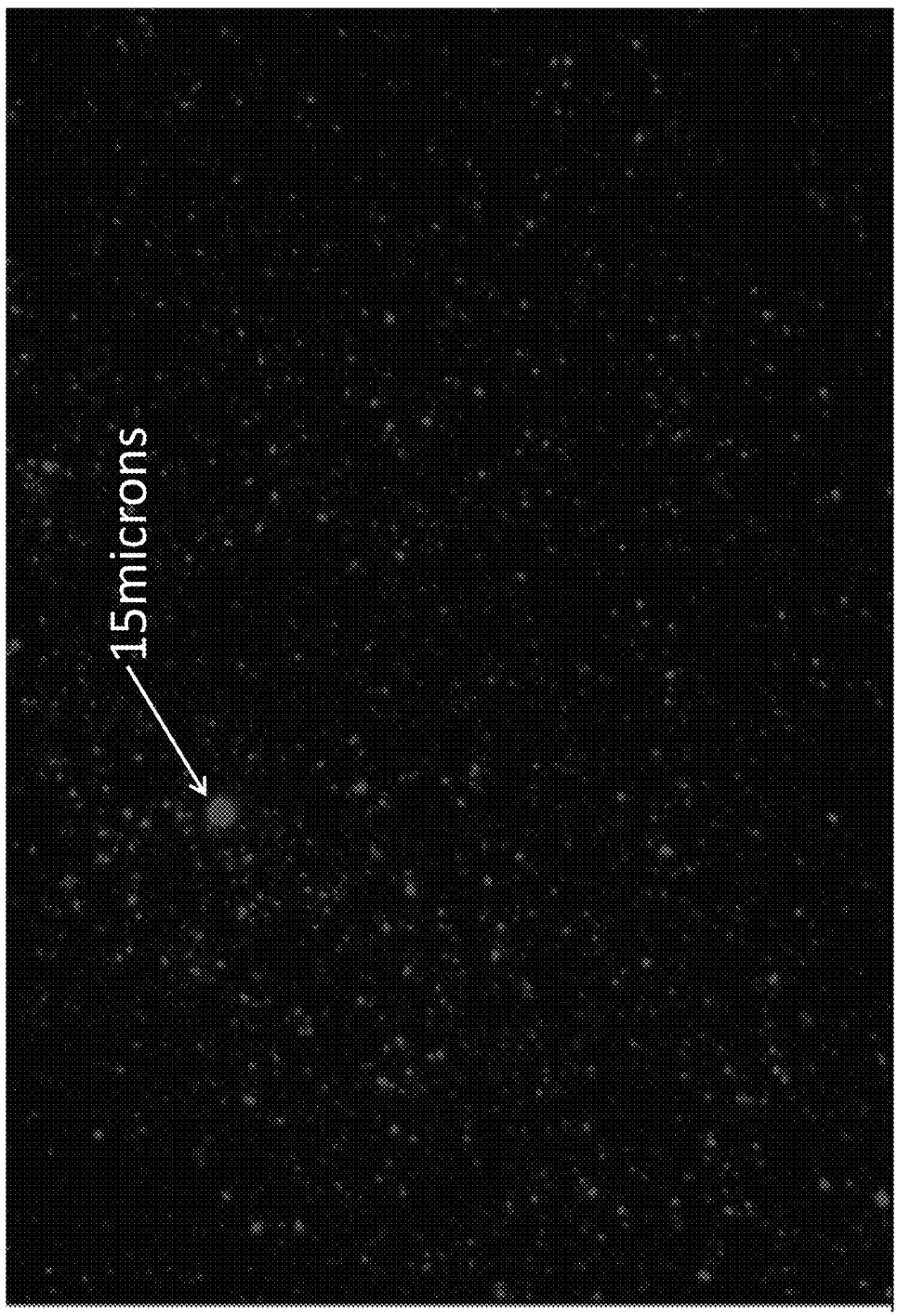

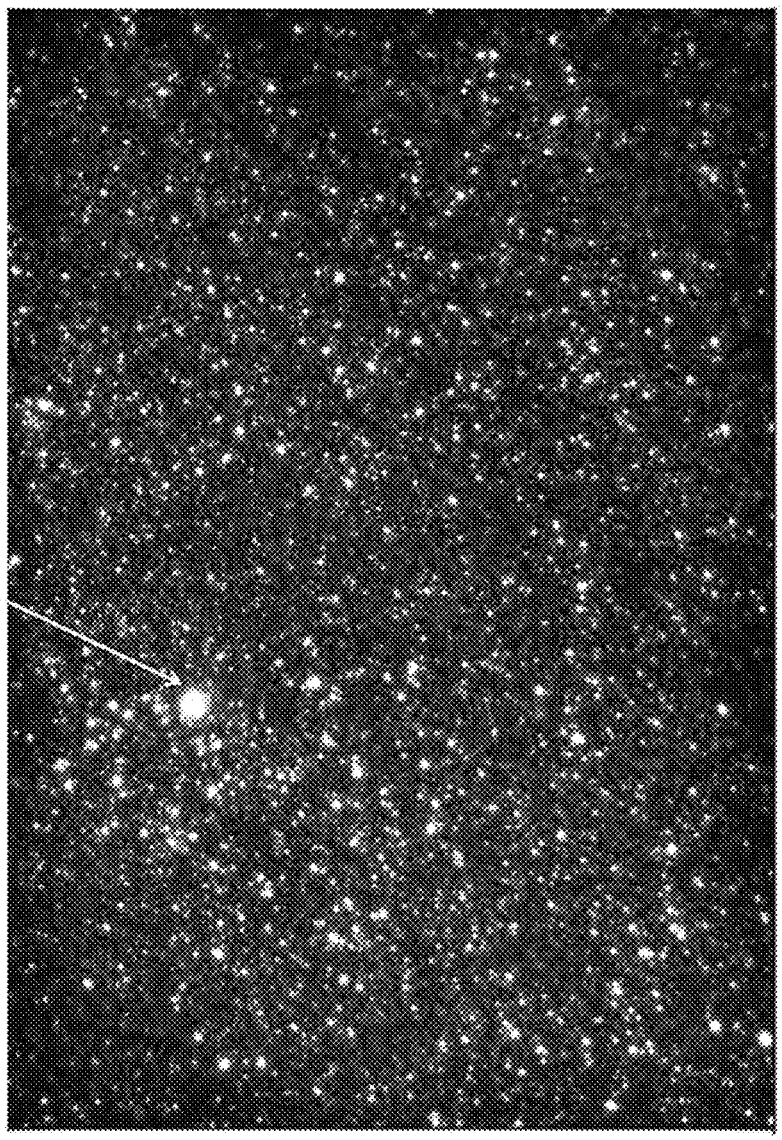

FLUORESCENT DIAMOND PARTICLES

CROSS REFERENCE TO RELATED DOCUMENTS

This application is related to and claims priority benefit of U.S. Provisional Patent Application 61/876,907 filed Sep. 12, 2013 to Olga Shenderova which is hereby incorporated herein by reference. The present application is also related to U.S. patent publication number US2009/0220556 to Shenderova et al., U.S. Patent Application Number US2010/0181534 to Shenderova, et al., U.S. Pat. No. 8,753,614 to Shenderova et al., and U.S. Pat. No. 8,728,429 to Shenderova, each of which is hereby incorporated by reference.

STATEMENT REGARDING FEDERALLY SPONSORED RESEARCH OR DEVELOPMENT

This invention was made with government support under HHSN268201300030C awarded by the National Institutes of Health. The government has certain rights in the invention.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Nanodiamond particles and their aggregates may contain optically-active structures such as non-diamond carbon atoms, dopants (non-carbon atoms in substitutional or interstitial positions within the diamond lattice), point defects, linear defects, planar defects, interstitial carbon atoms and/or complexes of the above which exhibit weak photoluminescent properties. Examples of optical structures include, but are not limited to substitutional or interstitial nitrogen (N), nitrogen atom(s) complexes with vacancy(s) (V), substitutional or interstitial Si atom, Si atom(s) complexes with vacancy(s) and others.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings.

FIG. 9, which is made up of FIG. 9A and FIG. 9B shows a micrograph of fluorescent diamond particles with initial size 15 microns milled using the matrix-assisted ball milling of Example 8 consistent with embodiments of the present invention.

GLOSSARY

Figure 1:
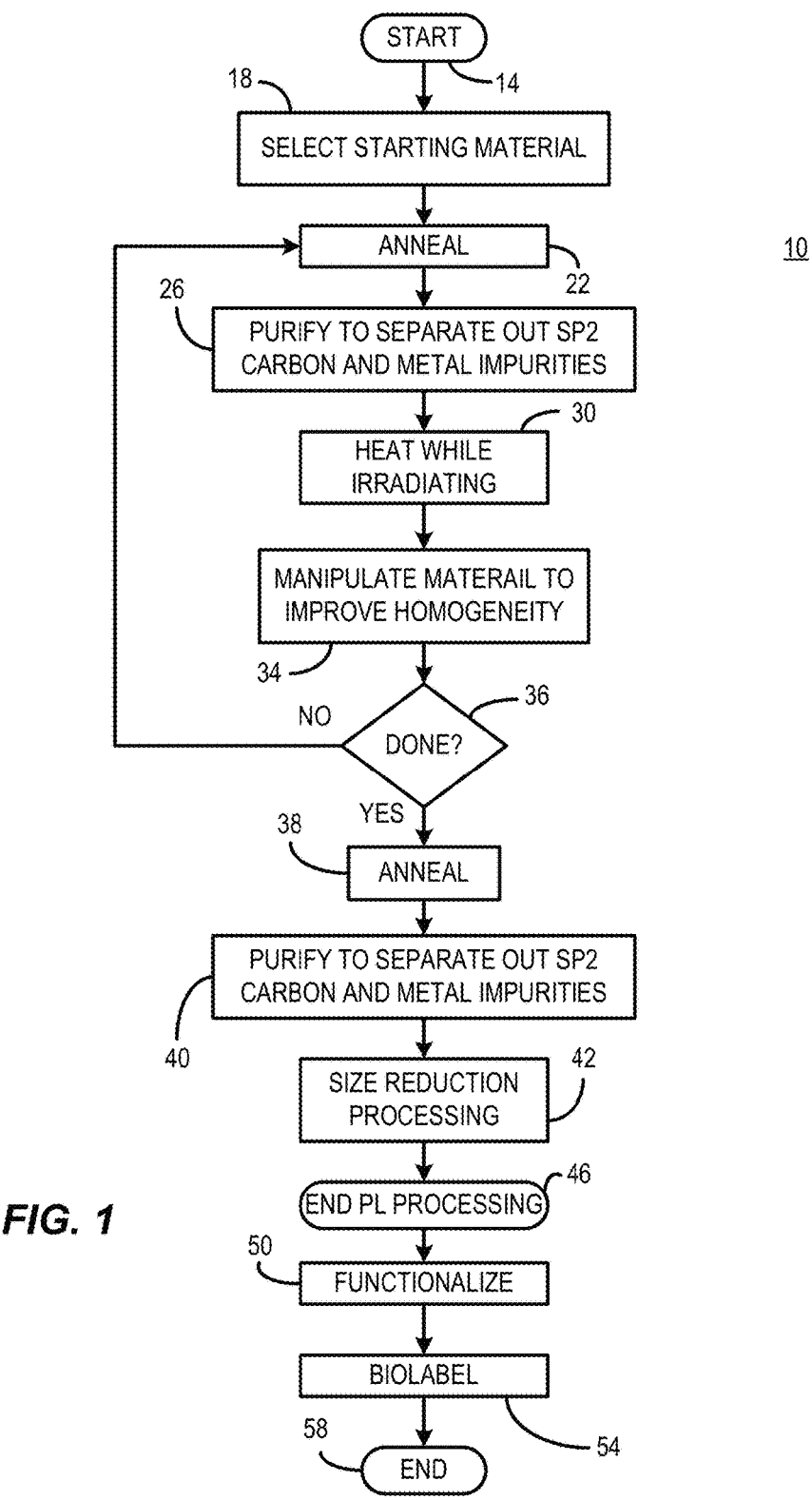
FIG. 1 is an example flow chart of an illustrative embodiment of a process consistent with certain example embodiments of the present invention.

Reference throughout this document to "one embodiment", "certain example embodiments", "examples", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "a" or "an" or "the", as used herein, are defined as one or more than one.

The term "plurality", as used herein, is defined as two or more than two.

The term "another", as used herein, is defined as at least a second or more.

The terms "including" and/or "having", as used herein, are defined as comprising (i.e., open language).

The prefix "nano" as used, for example in "nanoparticle" is intended to refer to particles having length in at least one dimension in the range of approximately 1-1000 nanometers. However, in some particular cases, the length scale for achieving the properties and phenomena consistent with certain example embodiments of the present invention may be somewhat smaller than 1 nanometer or slightly larger than about 1000 nanometers.

The term "nanodiamond" refers to diamond particles with sizes from approximately 1 nm to approximately 1000 nanometers and particularly to about 1 nm to about 300 nm. The term "nanodiamond" is broadly used for a variety of diamond-based materials at the nanoscale (the length scale of approximately 1-1000 nanometers) including pure-phase diamond films, diamond particles and their structural assemblies.

The term "microdiamonds" refers to diamond particles with sizes from approximately 1 micron to about 1000 microns.

The term "detonation nanodiamond" refers to a diamond particle that originates from a detonation, and is sometimes also referred to as "ultradispersed diamond (UDD)".

The term "HPHT nanodiamond" refers to a nanodiamond particle that was produced by grinding microdiamond powders manufactured by static high-pressure, high-temperature (HPHT) synthesis, e.g., by use of special presses.

Reference used herein to heating of particles as a part of the processes of processing diamond nanoparticles as described means that either the particles are heated during irradiation in a manner separate from any heat generated by the irradiation itself, or that the heating of the particles is by virtue of the irradiation with suitable controls imposed on the heat (e.g., balancing the heat added by irradiation with an amount of cooling provided to obtain the desired heat profile).

The term "brightness" as used herein is brightness as measured by taking PL spectra for 1 mg/ml slurry. The brightness is expressed in arbitrary units due to dependency on measurement setup, but using the same setup, the "brightness" can be compared relative to two samples or between samples and a reference sample or reference material such as Atto dyes.

The term "high energy radiation" and the like means radiation having energy high enough to knock-out or displace a carbon atom from the diamond lattice of a diamond particle. High energy radiation is generally considered to be radiation that has energy of about 1 MeV or greater for electron or proton irradiation.

The term "vacancy" or "lattice vacancy" is used to refer to a point defect in a diamond lattice in which a carbon atom is absent from its position in the diamond lattice.

The term "nitrogen-vacancy (NV) center" is a lattice vacancy neighboring a substitutional nitrogen. The term is often used herein without specifying if they are negatively charged centers or neutral centers, which typically are produced simultaneously, but in teaching of increased production of NV centers we often mean an increased production of negatively charged NV centers.

The term "silicon-vacancy" color center in diamond lattice is a lattice vacancy neighboring a substitutional silicon atom.

Ranges described herein include any sub-range within the range recited. Recitation of ranges of values herein are merely intended to serve as a shorthand method of referring individually to each separate value falling within the range, unless otherwise indicated herein, and each separate value is incorporated into the specification as if it were individually recited herein.

The word "about" or "approximately" or "around" when accompanying a numerical value is to be construed as indicating a deviation of up to and inclusive of minor deviations from the stated numerical value, for example in many instances within up to about 2-10%.

The use of any and all examples, or language indicating a example ("e.g." or "such as" or "for example") provided herein, is intended merely to better illuminate the invention and does not pose a limitation on the scope of the invention unless otherwise explicitly claimed. No language in the specification should be construed as indicating any non-claimed element as essential to the practice of the invention.

DETAILED DESCRIPTION

While this invention is susceptible of embodiment in many different forms, there is shown in the drawings and illustrations and will be herein described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

Among inorganic fluorescent nanocrystal materials, diamond nanoparticles (nanodiamonds) demonstrate properties of an ideal biological fluorescent probe. They have low cytotoxicity and are biocompatible making them attractive relative to quantum dots (QDs) when other factors are equal. They are chemically inert and stable. Nanodiamonds (NDs) containing NV color centers exhibit such as those produced in accordance with the present teachings exhibit high fluorescence brightness within the approximately 600-800 nm wavelength range, suitable for in vivo and in vitro imaging. The emission shows no signs of photobleaching and blinking even under high-power laser excitation, making such particles very attractive relative to fluorescent dyes and proteins. In addition, the surface of diamond particles can be readily functionalized with biomolecules for specific biomolecular targeting or nonspecific binding with nucleic acids and proteins without affecting their fluorescence properties. They are well suited for biological applications such as biomolecular labeling, cellular labeling and imaging, single-particle tracking, drug delivery and diagnostic, open-field surgery, image-guided therapy, thermal sensing and gene therapy. Nanodiamonds containing NV centers are also used in quantum optics, nanomagnetometry, quantum information processing and quantum cryptography.

Other features of certain examples include ease of use, multicolor-emission capability, multicolor imaging, and multiphoton-imaging capability. Additionally, the intracellular contrast of photoluminescent NDs can be enhanced by time-gated imaging. This technique has been applied to take advantage of the long decay lifetime, up to about 20 ns, of photoluminescent NDs in comparison to the short decay lifetime of the cell medium autofuorescence (about 2 ns).

NV centers can be produced in diamond particles of micro- or nanometer size. Nitrogen is the most common impurity in diamond, incorporated into the crystal lattice as an individual atom replacing a carbon atom in the diamond lattice. Type Ib diamond, typically synthesized by high-pressure-high-temperature methods contain approximately 100 to 200 ppm of atomically isolated nitrogen as an impurity. Nitrogen vacancies can be created in the diamond lattice by high energy electron (approximately 1-15 MeV) or proton (approximately 1-3 MeV) irradiation, a process which creates more vacancies in the lattice. A subsequent annealing (usually at 700-850° C. for a few hours, e.g., 1-5 hours) causes vacancies to migrate to substitutional nitrogen atoms.

An alternative way to produce NV centers in diamond is by the use of low energy (about 40 keV) alpha-particle irradiation followed by annealing. It is also possible to use gamma radiation and thermal neutrons to produce vacancies in diamond and then apply annealing to produce NV centers.

Both negatively charged and neutral nitrogen-vacancy centers are produced by these methods. Negatively charged NV centers are of higher interest for applications due to their spin properties. Despite recent progress, the synthesis of small and homogeneously bright nanodiamonds still takes more effort to meet the standards of commercial bioimaging labels.

Currently available photoluminescent nanodiamonds exhibit comparatively low levels of brightness—particularly in nanoparticles sized between approximately 5-50 nm, as well as a lack of brightness uniformity among the nanoparticles. Some particles may be comparatively bright, while others may contain only a single color center or no color centers at all and are comparatively dim. The present teaching provides for production of bright fluorescent diamond (FND) in larger volume and at a lower cost, and with more uniform and stable PL characteristics than currently produced FND.

NV centers can be produced by irradiation of nanodiamonds. There are several factors which should be considered regarding the choice of the type of irradiation and the overall strategy of NV centers production, such as: (i) vacancy production efficiency, (ii) uniformity of the vacancy production as a function of depth, (iii) vacancy survival rate after irradiation, (iv) overall lattice damage during irradiation (making NV centers optically inactive), (v) amount of the material treated in a single run, and (vi) availability of the irradiation source. PL ND particles should desirably have high PL brightness and particle brightness uniformity. Irradiated material should desirably have approximately the same number of vacancies per unit volume over the entire bulk of the material. In accord with the present teachings, electron beam irradiation has been found to provide good results in the techniques taught herein.

The brightness of PL ND can be enhanced, once starting diamond material with a high concentration of substitutional nitrogen atoms is selected and high vacancy concentration is achieved. However, simply increasing the irradiation dose is not enough to achieve the desired results, and increases the cost of treating the particles dramatically. The conversion percentage of N and vacancies (V) into NV centers (particularly, negatively charged NV centers) in bulk diamond is approximately 25-30%. However, this conversion percentage has not yet been achieved for nanodiamonds, and there are several opportunities for further improvement. In the current teaching, further improvement is obtained by control of the temperature of the particles during irradiation as well as alternating irradiation and annealing, decreasing the lattice damage and increasing the yield of optically active NV centers.

One strategy for improving the NV center yield involves a careful choice of the size of starting material. The probability of NV center creation in nanocrystals decreases when the particles sizes are less than approximately 50 nm. This is because more vacancies are expected to anneal (diffuse) to the surface.

In order to increase the number of NV centers in small size nanodiamonds and overcome vacancies annihilation at the particle surfaces, NV centers can be created in larger size diamond crystals, which can then be reduced in size by jet milling. While the approach allows a significant increase in the yield of NV centers, jet milling of diamond particles is a cumbersome process. A planetary mill can be used to further process the particles created by jet milling. But, the final overall yield of ND particles from the starting material using this process is relatively low, and the process is quite time consuming.

In accord with certain example implementations, the starting material can be selected to have a diamond particle size range which is highly efficient for production of bright small FNDs. This particle size has been found to be approximately 100-300 nm. To optimize this process, the particles should be not too small or a low density of produced NV centers and particle damage can result. Similarly, the particles should not be too large so as to avoid much of the long expensive process of fragmentation of FND, particles damage, and low yield of a high quality small size fraction.

In certain example embodiments, crystal particles larger than about 100 nm were used as a starting material to increase the overall yield of NV centers as compared to irradiation of 10-50 nm particles. The size range of ND used for irradiation can approximately encompass a size range from about 100 nm to about 20 microns, more preferably about 100-1000 nm and even more preferably still about 100-300 nm. High pressure, high temperature synthesized diamond particles can be used, as well as diamond particles containing substitutional nitrogen produced by other means. Then the creation of NV centers can be performed by annealing the diamond particles in vacuum followed by size reduction of the particles (e.g., to about 10-50 nm size range or even sizes below 10 nm, e.g., 5, 6 or 7-10 nm). Bead milling of ND can be carried out to obtain particles of reduced size. The approach of using diamond particles with sizes above about 100 nm instead of 10-50 nm ND powder as starting material also has additional processing advantages. For example, electron beam irradiation of about 20 nm HPHT diamond results in partial amorphization of the material due to the large surface area, but larger particles do not suffer from this phenomena. In addition, in this approach the final concentration of NV centers will be higher since the total surface area is smaller. Particle surfaces are a sink for vacancies and migration of vacancies to the surface competes with migration of vacancies to substitutional N atoms and formation of NV centers.

The starting material is preferably purified before irradiation to remove the non-diamond carbon (and metal impurities if they are above about 0.1 wt %). It is possible that islands of starting graphitic material present on ND during irradiation play the role of centers of further enhanced graphitization. So, overall graphitization of the material after irradiation is higher for non-purified diamond. There are several methods to purify the ND of the $sp^2$ carbon from the surface of the diamond particles. By way of example, ND can be purified to remove $sp^2$ carbon from the surface using a rotary furnace with a quartz tube containing ND. In this method, dry air is blown through the tube while it is at an elevated temperature and while it is rotating over a period of few hours (e.g., about 1-5 hours). This procedure allows uniform air oxidation of the non-diamond carbon present in the powder. Alternatively to, or in addition to, high temperature treatment in air or ozone, acid treatment at elevated temperature or in a microwave reactor can be used to provide additional purification from non-diamond carbon and metal impurities.

Another approach to purify FNDs from $sp^2$ carbon is use of $sp^2$ carbon etching with atomic hydrogen. This can involve hydrogen microwave plasma etching, hydrogen atmospheric pressure plasma etching, heating in a flow of hydrogen gas or forming gas. Treatment with hydrogen at several hundred degrees centigrade (e.g., 300-600° C.) helps etching of $sp^2$ carbon. Treatment with electromagnetic irradiation is another method to purify the material to remove $sp^2$ carbon from the surfaces of diamond particles.

In addition to purification, high temperature annealing of the ND can be used before irradiation (or before multiple iterations of irradiation) to cause diffusion of existing vacancies to form NV centers. Annealing can be done at about 700-1100° C. and more preferably at about 850-950° C.; more preferably still at about 875-925° C. and most preferably at about 900° C. in a vacuum or an inert gas environment for a period of approximately two hours, or with the range of about 1 to 3 hours. The purification can be done after annealing and before irradiation. This can be followed by multiple iterations of irradiation followed by annealing followed by purification.

Electron beam irradiation is used in certain embodiments consistent with the present teaching. During electron beam irradiation it has been found beneficial to control the temperature of the particles being treated. To this end, in certain embodiments consistent with the present teachings the ND particles may be enclosed in a thermally conductive enclosure in order to contain the particles for ease of handling and to dissipate heat resulting from the high power density of the high voltage, high current electron beam. For example, a thermally conductive metallic enclosure may be used. The enclosure may, in one example, be made from aluminum or other suitable metal that provides good thermal conductivity. In certain embodiments, the enclosure may contain isolated compartments, where diamond powder (of the same or different types) may be placed for irradiation. The box or enclosure also may be periodically or continuously rotated, agitated or otherwise moved about to achieve a more uniform irradiation of all of the powder being treated.

In order to help assure good heat conduction throughout the ND powder to be irradiated (which may be about 1 mm thick or more depending upon the electron beam energy to be utilized (e.g., approximately 1-15 MeV)), a fraction of particles several hundreds of microns in size (e.g., more than 100 microns) with higher thermal conductivity than the smaller ND particles can be added. Alternatively, formation of compacts of these micron sized particles with nanometer sized ND powder can be used and followed by irradiation.

In accord with certain example implementations, the process includes electron beam irradiation of nanodiamond powder to submicron diamond powders. Before irradiation submicron diamond powder is annealed at about 700-1100° C. for about 1-3 hours and purified to remove the $sp^2$ carbon. The submicron sized ND particles can be fragmented (e.g., using mechanical forces to break down the particles such as in bead milling) to reduce the submicron particles to nanometer sized particles following irradiation and a second annealing at about 800-1000° C. for about 1-3 hours. It is expected that it will be possible to produce and preserve more NV centers by using 100-300 nm powder as the starting material for irradiation to minimize the total surface area as compared to nanometer sized particles where the surface plays the role of a vacancy sink. Many variations will occur to those skilled in the art upon consideration of the present teachings.

In certain embodiments as described herein, a process consists of irradiation in sequences, alternating between processes of intermediate sample purification and annealing for creation of the vacancy-nitrogen complexes, which are energetically more stable than single vacancies (substitutional nitrogen plays the role of a vacancy trap in diamond). During intermediate annealing/purification diamond particles can be remixed, contributing to more uniform irradiation of the diamond powder. Irradiation can be done in increments to achieve the total irradiation dose between about, for example, from about $1-3\times10^{18}$ e/cm$^2$ up to about $1-5\times10^{19}$ e/cm$^2$ total dose.

Another example can include irradiation to about $1\times10^{19}$ e/cm$^2$, followed by annealing followed by purification, then up to about $5\times10^{19}$ e/cm$^2$ cumulative dose, followed by annealing and followed by purification, and then up to $1\times10^{20}$ e/cm$^2$ cumulative dose, followed by annealing and followed by purification. These examples are merely illustrative of possible processing sequences. This sequence of operations is not known to have been previously discovered to provide the benefits described herein.

The target irradiation is chosen based on the purpose of the FND production. The dose can be based on the goal of production of FND with certain brightness (for example, from comparison with the brightness of a reference material). Another goal can be production of FND of a certain size with the highest possible brightness. The highest possible brightness will depend on the concentration of single nitrogen atoms in the starting diamond material, but also on the amount of single vacancies produced as well as efficiency of the formation of NV centers (especially negatively charged NV centers) from the single nitrogen and vacancies defects. Lattice graphitization starts at very high doses, $10^{22}$ vacancies/cm$^3$, corresponding to a dose of 2E+22 e/cm$^2$ for 1.9 MeV electrons. But even at much lower doses, there are doses reached when further irradiation does not provide a substantial increase of negatively charged NV centers due to various factors, such as complexation of vacancies (combination of vacancies into bi-vacancies and groups of vacancies), irreversible damage of the lattice, depletion of electron donors (substitutional N) to produce negatively charged NV centers, etc.

Theoretically, the highest concentration of negatively charged NV centers is about 50% of the concentration of substitutional N. In such an estimate, it is assumed that substitutional N atoms are uniformly distributed in the diamond lattice and are located far enough from other defects (for example, the surface), which can influence donation of an electron by the N atom to a nearby NV center. It is also assumed that the substitutional N atoms are located far enough from other defects which can prevent formation of the NV center from the N atom and a vacancy as well as influence charge transfer to/from the center. In general, the highest possible brightness depends on the concentration of substitutional N in the starting material, distortions of the diamond lattice and the particles size. During crushing of HPHT micron-sized diamond losses of some fraction of nitrogen atoms residing along cleavage surfaces are inevitable, so for smaller particles the N concentration is decreased.

Due to the efficient formation of NV centers and reduced lattice damage due to annealing and formation of NV centers between irradiation steps, the overall dose can be lower than a typical dose that would normally be used to achieve a particular level of fluorescent intensity when this dose is accumulated in a single run. Hence, the cost of irradiation and production of fluorescent NDs can be reduced. Alternatively, for the same total dose of irradiation higher brightness can be achieved if the irradiation is done in multiple stages such that each irradiation is followed by annealing and purification of diamond particles until the desired total dose is accumulated.

In accord with certain implementations consistent with the present teachings, the processing of diamond particles to enhance photoluminescence involves first annealing and purification of the particles and then involves formation of NV centers during irradiation of diamond particles by high energy irradiation (electrons, ions, thermal neutrons, gamma irradiation, etc.). The temperature of the diamond particles during irradiation should be high enough to initiate diffusion of vacancies (above approximately 500-600° C.). In addition, heating during irradiation can help to decrease lattice damage. For example, heating of the particles to above approximately 200° C. during irradiation results in annealing of interstitials helping to reduce lattice damage (due to buildup of interstitials) and vacancies losses through annihilation at interstitials. The irradiation is done at a temperature high enough to assure movement of vacancies to substitutional nitrogen atoms but not so high as to result in burning of the nanodiamond powder if the irradiation is done in the presence of an oxidizer. The target temperature can be achieved, for example, by beam induced heating of the nanodiamond powder. The resulting particles can be purified by various treatments to reduce impurities such as $sp^2$ carbon at the surface.

In some known techniques, diamond powder is cooled during irradiation to avoid temperatures high enough to cause its conversion to graphite and it's burning in the presence of an oxidizer. For example, in certain processes the temperature of the diamond particles are maintained at a temperature lower or equal to 80 degrees Celsius. However, experiments as discussed herein have found that such low temperatures are not necessary and contrary to this conventional processing increased temperature during irradiation can provide significant benefits. Temperatures above approximately 500-600° C. promote formation of NV centers and, if realized during irradiation, have been found in the experiments described below to result in NV formation during irradiation. For example, for 100 nm ND powder dispersed over a cooling plate at 1.5 mm thickness, the temperature of the powder during irradiation was measured to exceed approximately 400° C. or 500° C. depending on the beam current (for example, 25 mA or 30 mA).

At the same time, the temperature should not be too high in order to avoid excessive damage and burning of nanodiamonds and their loss (loss of HPHT 100 nm NDs begins in air due to oxidation at temperatures exceeding about 600° C.). However, providing a non-oxidizing atmosphere during irradiation allows one to increase the temperature during irradiation to one needed for efficient vacancy diffusion (for example, temperature as high as about 600-900° C.). In certain of the experiments conducted, the temperature was elevated to as much as approximately 400-600° C. Also, the presence of oxygen during irradiation at a temperature when $sp^2$ carbon is oxidized (but does not burn the diamond) may help to purify diamond during irradiation from $sp^2$ carbon formed due to damage of diamond during irradiation.

The determining factor for temperature selection is that the temperature be high enough for vacancy movement and vacancy-nitrogen color center formation in the diamond powder being treated. This approach can be extended to bulk diamond, micron-sized diamond particles, diamond films and other forms of diamond. Due to the efficient formation of NV centers during irradiation, the overall dose can be lower than a dose that would normally be used to achieve a particular level of fluorescent intensity at a lower temperature. Hence, the cost of irradiation and production of fluorescent NDs can be reduced. Alternatively, for the same dose of irradiation higher brightness can be achieved as compared to irradiation of diamond particles at a lower temperature.

Using the above teachings bright fluorescent NDs with average particle size 100 nm were obtained in experiments at modest irradiation doses (5E+18 e/cm$^2$), which are 5-10 times lower than doses typically reported and recommended for production of fluorescent NDs using electron irradiation. Despite use of a lower dose of radiation, the particles surprisingly exhibited brightness that was almost twice as bright as a commercial 100 nm sample produced by irradiation with He ions when their spectra were measured for 1 mg/ml slurries in DI water and the peak intensities were compared. The produced particles were also more than 10 times brighter than Atto 532 organic dye when excited at the same conditions and their fluorescent intensities (a single particle and a single dye) were compared side by side using total internal reflection fluorescence microscopy measurements.

Referring now to FIG. 1, an example of a process 10 consistent with certain embodiments of the present teachings for increased yield of NV centers starts at 14 after which a starting material of nanodiamond powder is selected at 18 (e.g., with high concentration of substitutional nitrogen, with particle sizes ranging from about 100 nm to 1000 nm or from about 100 to 300 nm). The starting material is annealed to create NV centers based on natural defects present in the particles at 22. At 26, the material is purified to remove surface $sp^2$ carbon impurities, metallic impurities and other impurities. At 30, the diamond powder is heated to a temperature high enough to promote formation of NV centers during irradiation, and the powder is irradiated (e.g., by high energy electrons, protons or ions). In certain embodiments, the temperature is caused to be at least a temperature at which vacancies in the diamond particles diffuse to form fluorescent color centers during irradiation by heating the diamond particles, for example, using a heated stage, a heated container, exposure to infrared radiation or by the heating induced by the radiation itself under suitable controls to obtain the desired temperature.

The powder is manipulated at 34 (e.g., by rotation, agitating, linear movement, circular movement, random movement or other movement) to improve the homogeneity of the vacancy distribution in irradiated material. The manipulation may be done while the powder is being irradiated in certain example embodiments or between multiple irradiation sequences. In an example process, cycles of annealing (e.g., at 800-1000° C. in vacuum, and preferably at about 900° C., e.g., between about 875 and 925° C.), purification and irradiation after 36 are repeated via the loop from 22 to 36 until the desired result is achieved or a defined number of iterations is completed.

After this set of iterations is done at 36, a final sequence of annealing and purification is carried out at 38 and 40 respectively. The loop between 22 and 36 can be iterated for two cycles or more until desired properties such as fluorescent brightness or highest possible brightness of the particles is achieved. Once these cycles are completed, the material is sized and shaped at 42, for example by size fractionation using for example, centrifugation or grinding or milling the irradiated and annealed material to produce sub-100 nm particles followed by size fractionation. After grinding and fractionation, additional purification (for example, to remove $sp^2$ carbon exposed during milling of the particles) can be also performed as a part of the size reduction processing at 42. Once sized and shaped at 42, the basic process of creation of photoluminescent nanoparticles is complete and this portion of the process ends at 46 with fluorescent material that can be stored or used by the further processing described or by other processes.

Size reduction and shape rounding by other means can also be used, including oxidation and etching, milling in liquid nitrogen, treatment in oxidative plasma, ultrasound acid etch, microwave acid etch, laser irradiation, UV irradiation, thermo-chemical etching and other methods. An additional method of ND particle size reduction and shape rounding includes thermo-chemical etching involving high temperature treatment of diamond particles brought into contact with metals which possess catalytic activity toward diamond and can dissolve diamond at high temperature (for example, Fe, Ni, Mn, Mo, Ce and others). In addition, chemical mechanical polishing of diamond surfaces using molten $KNO_3$ (as well as KOH) is a method which can be adapted to ND particle size reduction. Diamond particles can be milled in the presence of catalysts to decrease particle sizes and contribute to the etching of sharp edges and particle rounding.

After processing to enhance photoluminescence ends at 46 above, the ND containing NV centers can be further processed by functionalizing the particle surfaces at 50, e.g., by reduction reaction, silanization, carboxylation, amination and/or other methods. Functionalization can be also done mechanochemically during grinding of ND to smaller sizes. The small bright ND-NV can be further processed by biolabeling or other processes specific to the application of the FND particles. For example, at 54 the particles can be biolabeled with biological molecules, proteins, enzymes, a nucleic acid, a polymer, antibodies, ligands, drugs etc. by conjugation reactions and other processes. The purified diamond particles can be functionalized, for example, with one or more functional group such as carboxylic groups, hydroxyl groups, amino groups, epoxy, polyethylene glycol groups, hydrocarbon chains, hydrocarbon groups, aromatic groups, nucleophiles, thiols, sulfurs, acids, bases, or fluoro-containing group.

This process ends at 58 with use of the particles for their intended application. Other variations will occur to those skilled in the art upon consideration of the present teachings.

A similar procedure can be used for increasing the production yield of other color centers, such as H3, N3, SiV and other centers, where a vacancy is a constituent of the color centers.

In certain embodiments, after purification of the diamond particles, the diamond particles can be conjugated with any of a number of materials such as biological molecules, nucleic acid, proteins, antibodies, ligands, dyes, fluorescent species, radioactive species, paramagnetic species, image contrast agents, drug molecules or polymers.

Figure 2:
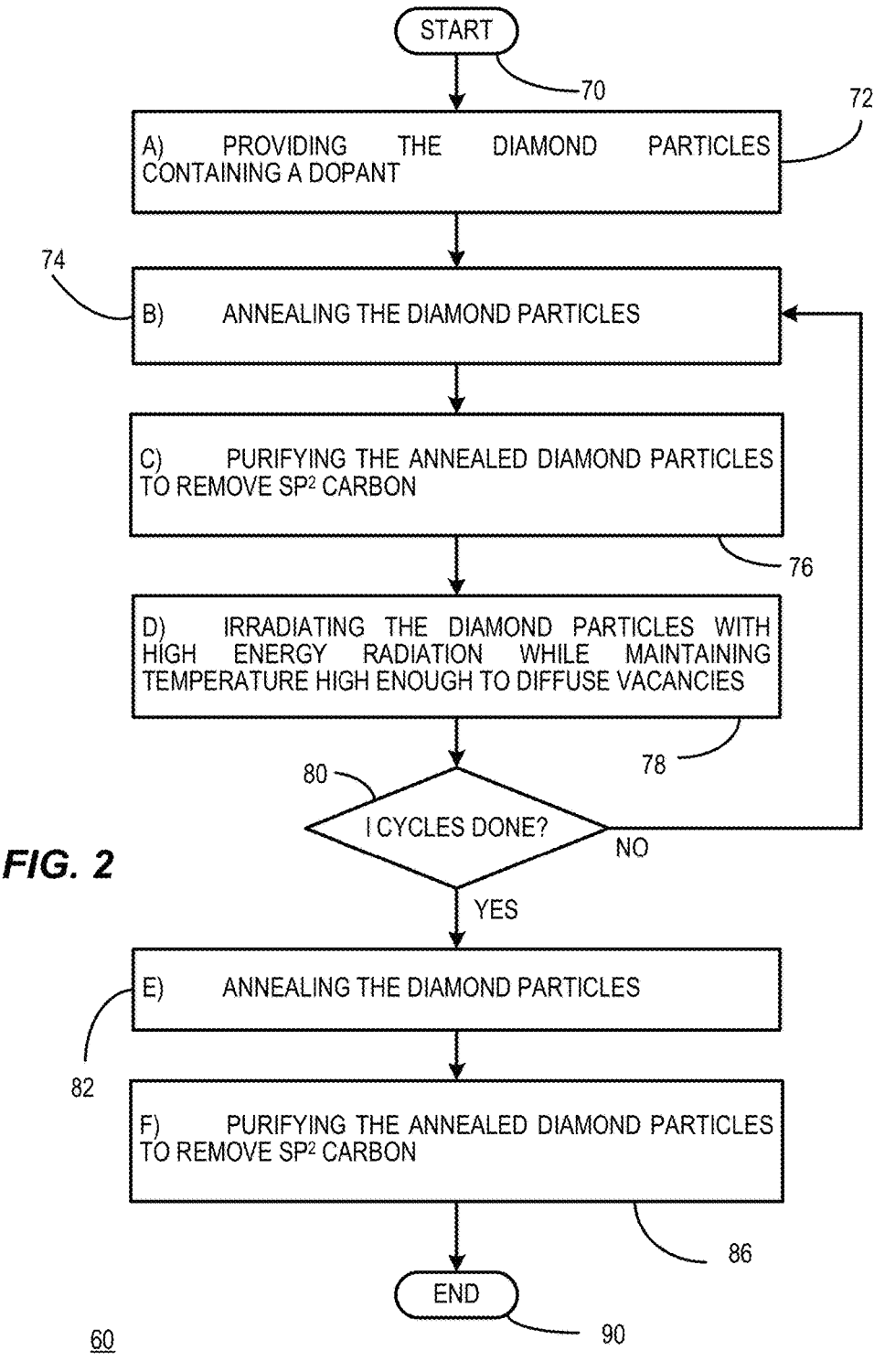
FIG. 2 is an example flow chart of an illustrative embodiment of a process consistent with certain example embodiments of the present invention.

With reference to FIG. 2, another example method 60 of processing diamond particles to produce fluorescent color centers is shown starting at 70 after which the process involves A) providing the diamond particles containing a dopant to diamond (such as, for example, nitrogen, a group of nitrogen atoms, silicon, chromium, nickel or cobalt) which can form photoluminescent centers when combined with vacancy(ies) at 72; B) annealing the diamond particles at 74; C) purifying the particles to remove $sp^2$ carbon from the surface of the diamond particles at 76; D) irradiating the diamond particles with high energy radiation while maintaining temperature high enough to diffuse vacancies at 78; E) after irradiating the diamond particles at 78, the process B)-D) can be repeated for a number of iterations until the total number of iterations I is reached where I is two or greater. Once I has been reached at 80, E) the diamond particles are annealed at 82; F) the particles are purified to remove $sp^2$ carbon at 86. I is an integer greater than or equal to 2 where the number of cycles I is determined in order to obtain a desired target product. This example process ends at 90, but can continue with other processing depending upon the desired application, etc.

For the diverse range of applications where it can be utilized, a range of photoluminescent NDs with different levels of brightness and different sizes can be utilized. Well-defined distributions (size-brightness) can either be achieved by determining a method that generates the desired distributions directly, or by separating the fluorescent nanodiamonds based on size and brightness after the fact. The NDs can also be sorted in accordance with other criteria as desired.

Electron beam irradiation provides a more uniform distribution of vacancies along the penetration depth, as well as minimizes the permanent damage of the diamond lattice, as compared to irradiation with ion beams. But other types of irradiation may also be used. It is possible to apply various mechanisms such as shaking, moving, rotating or mixing of particles during irradiation to ensure better uniformity of irradiation and consequently better uniformity of vacancy formation. If one irradiates approximately 100-300 nm (or possibly larger) diamond particles with a narrow size distribution, it is believed that the yield of NV centers should increase (due to decreased vacancy migration to the surface during annealing associated with smaller size ND particles) as well as the formation of NV centers will be more uniform over the bulk of particles of similar sizes. The sub-micron particles containing a uniform distribution of NV centers can be ground and fractionated according to their sizes. If NV centers are uniformly distributed in the ND particles with narrow size distribution, then ND with a different number of NV centers (according to the size) can be selected simultaneously with size selection.

Although the examples primarily utilize HPHT diamond particles, other types of diamond particles may also be treated to create NV centers. Those diamond particles can be obtained by grinding irradiated and annealed diamond films grown by the chemical vapor deposition (CVD) method, diamond particles produced by a shockwave conversion of graphite into diamond, diamond particles produced by detonation of a mixture of graphite and high energy explosives, diamond particles obtained by a laser ablation of carbon precursors and other methods.

Nitrogen incorporation into diamond material can be non-uniform. For example, N incorporation into (001) facets during growth of HPHT diamond is very low. Thus, in principle there can be nanodiamond particles which do not contain N and NV centers. In this case selection of ND particles containing NV centers can be based upon their brightness. One of the methods to do such selection can involve light-sensitive materials which can change state when exposed to light. Under irradiation of a suspension of FND with green light, FND containing NV centers will re-emit red light, with intensity that increases with increasing concentration of the NV centers. Emission of red light should trigger activity of light sensitive surrounding material, and initiate, for example, a photochemical reaction between the specie and surface of ND which can be specifically functionalized to form a covalent or other type of bonding under red light. NDs with attached photosensitive material will have different mobility in external fields, for example, in a gravitational field, electric field, etc. and can be separated by centrifugation, gradient density centrifugation, electrophoretically, chromatographically and by other suitable techniques. The concentration of FND and light sensitive molecules for the best efficiency can be experimentally determined. The optimal time of illumination of the suspension can also be experimentally determined.

An alternative approach to change the mobility of FND particles emitting red light (e.g. containing NV centers), can be attachment of light sensitive species to all FND particles and then illuminating the mixture with green light. In this case the red light emitted by FND containing NV centers should cause debonding of the light sensitive material with FND. For example, if plasmons are generated by red light in gold particles attached to FND and cause local heating, this local energy release can be enough to break the bond between a plasmonic particle and FND. Then ND with different numbers of attached light sensitive species can be separated based on different mobility of ND in an external field. Again, the concentration of ND-NV, light sensitive species and duration of the illumination with non-red light can be experimentally determined.

Two-photon excitation of NV centers in ND is also possible with a wavelength longer than red light (two photons are required to excite each NV center). Infrared radiation has longer penetration depths in a surrounding media than visible light. An approach of selection of ND by brightness is similar to the method described above. The reaction media containing ND with NV centers can be a suspension in a liquid or gel, or other matrix optically transparent to the wavelength of the illumination source that will trigger emission by NV centers. In this regard, the refractive index of the media can be selected to make the overall process more efficient. Gold nanoparticles, gold spheres, gold nanorods, etc. can be used as plasmonic nanostructures. Silver-based nanostructures could also be used.

Another way to separate ND according to the brightness of the emitted red light by NV centers in the ND is encapsulation of ND-NV into, for example, liposomes containing light sensitive agents. These agents should be sensitive to the light emitted by ND-NV (red and NIR). There are several methods for destroying liposomes and causing the release of their content based on the irradiation of the liposomes with light of a specific wavelength. Photochemical activation of the release of the contents of liposomes employs destabilization of the lipid membrane by light-induced isomerization, cleavage, or polymerization of its components. Controlled release by photocleavage typically involves inclusion of some form of photocleavable amphiphilic molecule into the liposomal membrane. Subsequent illumination of these modified liposomes triggers separation of the polar and nonpolar moieties of this molecule, with a concomitant loss of amphiphilic character which results in destabilization of the liposome. Other variations will occur to those skilled in the art upon consideration of the present teachings.

This strategy is based on photo-induced cleavage of naturally occurring lipids called plasmalogens by photodynamic sensitization. Plasmalogen can be used in combination with auxiliary lipids, such as lecithin, polyethylene glycol (PEG)-lipid, or cholesterol. Photoinduced cleavage of the labile vinyl ether linkage of plasmalogen results in vesicle leakage. The photocleavage can be sensitized by molecules incorporated in the hydrophobic region of the bilayer. Plasmalogen fragmentation can be sensitized by zinc phthalocyanine, tin octabutoxyphthalocyanine, or bacteriochlorophyll. These components absorb light between 630 and 820 nm and make triggering of liposomal content release by red and near infrared light possible.

The search for a release method triggered by long wavelength illumination led to the investigation of photosensitizers for photodynamic permeabilization of liposome membranes. Exposure of various liposome compositions to red light in the presence of photosensitizers, such as aluminum trisulfophthalo-cyanine, chlorine, or neutral zinc phthalocyanine, was tested. The use of dyes absorbing in the red to NIR range to sensitize plasmalogen fragmentation is one of the successful photocleavage strategies. The chemical moieties described can be also used in the strategy of linking FND with light sensitive moieties (covalently or not covalently) and performing red light induced cleavage or polymerization.

Photophysical release of the content from liposomes is also possible. Examples of photophysical release use photothermal conversion of absorbed light with ensuing thermal and/or mechanical processes in the lipid membrane and the surrounding medium. Methods for achieving photophysical release are developed around various light-absorbing moieties: molecular dyes, metallic particles, and plasmon resonant gold nanoparticles. Release from liposomes can be mediated by molecular absorbers. Hydrophilic molecular absorbers may be included in the liposomal core and hydrophobic absorbers in the bilayer. Upon illumination, molecular absorbers mediate photothermal conversion, which may increase membrane permeability of thermosensitive liposomes. There are several arrangements of liposomes with dyes acting as a photothermal transducer. A hydrophilic dye can be encapsulated in the aqueous interior of the liposome, a hydrophobic dye or lipid-dye conjugate can be incorporated in the lipid membrane, or a liposome can be surrounded by a solution of dye. Both one-photon and two photon photolysis of liposomes is possible, enabling the use of far red to near infrared laser wavelengths for release. One of the promising developments in the dye-mediated controlled release of liposomal content is the demonstration of two-photon release via photothermal conversion in lipophilic cyanine conjugates incorporated into the membrane.

Light mediated photomechanical release from liposome using plasmon resonance is also possible. Plasmon resonant structures can be tethered to the outside of liposomes, placed within the liposomal core, or created using the liposome as a template. Photothermal conversion in these structures leads to release of the encapsulated content via membrane disruption by thermal or mechanical stress. Very small nanoparticles of gold, in the single nanometer size range, have been shown to mediate photothermal conversion in liposomes, leading to release of their contents. This has been shown in three types of gold-liposome configurations: hexanethiol-capped hydrophobic gold nanoparticles incorporated in the liposome bilayer, gold nanoparticles protected with mercaptosuccinic acid and carrying negative charge encapsulated in the aqueous liposomal core, and gold nanoparticles covalently linked to the polar lipid head-groups. Control of the spectral position of this resonance is possible by varying particle shape and size, leading to tunability of the optical properties of such particles throughout the visible to near-infrared range.

Thermosensitive liposomes can be made with dipalmitoyl phosphatidylcholine, a monoacyl phospholipid, and a PEG-lipid conjugate coated with gold clusters by in situ reduction of gold chloride. In an example of liposome surrounded by gold shells, when illuminated with laser light, temperature rises due to photothermal conversion at the gold shell resulted in increased permeability of liposomal membrane and release of the encapsulated content. Sequences of short pulses, in the µs range, have been devised to achieve superb spatial control of the release process. Using the very short laser pulses which increase temperature at the gold nanoshells causes localized thermal expansion, or mechanical stress, within the sample; this is a form of photoacoustic conversion.

The chemical moieties described in photophysical interactions of light and light-sensitive moieties described above in the strategy using liposome encapsulation of ND-NV, can also be used in the strategy of linking ND with light sensitive material and performing red light induced cleavage of the ND and the light sensitive material link.

Selection of ND containing more NV centers from ND which do not contain NV centers or have low NV center content can be done as follows: ND particles can be encapsulated into liposomes containing light sensitive moieties (sensitive to red/NIR light) by any suitable mechanism of encapsulation of nanoparticles into liposomes. ND surface functionalization may be used. A suspension of the ND-liposome complexes is irradiated with light of a wavelength that initiates red/NIR light emission by NV centers in NDs. Light emitted by NV centers triggers destruction of liposomes and release of ND-NV. NDs that do not contain NV centers or contain a small amount of ND-NV will remain encapsulated in liposomes. It is easy to separate ND-NV remaining encapsulated in liposomes, destructed liposomes and released ND-NV. Duration of the treatment can be adjusted so that released ND-NV do not continue to damage surrounding liposomes. This approach can be also realized in a flow cytometer set up. Irradiating of a flow of FND encapsulated into liposome in one spot along a flow would help to control the process.

Thus, in accord with certain implementations consistent with the present teachings, a method of processing diamond particles to form fluorescent color centers, involves providing diamond particles having a surface and having a diamond lattice and containing at least one dopant; annealing the diamond particles in a vacuum or an inert atmosphere; after the annealing, creating vacancies in the annealed diamond particles by irradiating the diamond particles with high energy radiation; and while the annealed diamond particles are being irradiated, causing temperature of the diamond particles to be at least a temperature at which vacancies in the diamond particles diffuse and combine with at least one dopant to form fluorescent color centers.

In certain example implementations, the diamond particles have size in the range of approximately 1 nm to 100 microns. In certain example implementations, the diamond particles have size in the range of approximately 100 to 1000 nm. In certain example implementations, the diamond particles have size in the range of approximately 100 to 300 nm. In certain example implementations, the annealing is carried out at a temperature of approximately 850° C. to 1000° C. for a duration of approximately 1 to 3 hours; and the process further includes purifying the annealed diamond particles to remove $sp^2$ carbon at the surface of the diamond particles.

In certain example implementations, the purifying comprises oxidizing the $sp^2$ carbon or etching the $sp^2$ carbon using hydrogen. In certain example implementations, the irradiating comprises irradiating with high energy electrons, protons, ions, neutrons, gamma rays or photons. In certain example implementations, the irradiating is carried out with electrons having energy between approximately 1 MeV and approximately 10 MeV. In certain example implementations, the temperature is caused to be at least a temperature at which vacancies in the diamond particles diffuse to form fluorescent color centers during irradiation by heat generated by the high energy irradiation of the diamond particles. In certain example implementations, the temperature is caused to be at least a temperature at which vacancies in the diamond particles diffuse to form fluorescent color centers during irradiation by heating the diamond particles using a heat source that operates independently of the source of high energy radiation. In certain example implementations, after the irradiation, annealing the diamond particles is carried out in a vacuum or inert atmosphere at a temperature of approximately 850° C. to 1000° C. for a duration of approximately 1 to 3 hours followed by purifying to remove $sp^2$ carbon at the surface of the diamond particles. In certain example implementations, after the irradiation, the annealing is carried out at approximately 900° C. for approximately 2 hours. In certain example implementations, the purifying includes oxidizing of $sp^2$ carbon or etching of $sp^2$ carbon using hydrogen.

In certain example implementations, the process further involves fragmenting the irradiated, annealed and purified diamond particles to sizes in the size range of approximately 1 nm to 100 nm, followed by purifying the fragmented particles to remove $sp^2$ carbon and metal impurities from the surface of the diamond particles. In certain example implementations, the fragmenting comprises dry ball milling in a salt matrix, and where the salt to diamond particle ratio exceeds approximately 2:1.

In certain example implementations, after the irradiation, annealing the diamond particles in vacuum or inert atmosphere is carried out followed by purifying the annealed diamond particles to remove $sp^2$ carbon from the surface of the diamond particles; and functionalizing the purified diamond particles with at least one functional group such as for example carboxylic groups, hydroxyl groups, amino groups, epoxy, polyethylene glycol groups, hydrocarbon chain, hydrocarbon group, an aromatic group, a nucleophile, a thiol, a sulfur, an acid, a base, and a fluoro-containing group.

In certain example implementations, after the irradiation, annealing the diamond particles in vacuum or inert atmosphere is carried out followed by purifying the annealed diamond particles to remove $sp^2$ carbon from the surface of the diamond particles; and after the purification, conjugating with the diamond particles or attaching to the diamond particles at least one material such as for example biological molecules, a nucleic acid, a protein, an antibody, a ligand, a dye, a fluorescent specie, a radioactive specie, a paramagnetic specie, an image contrast agent, a drug molecule and a polymer.

In certain example implementations, after the irradiation, annealing the diamond particles in vacuum or inert atmosphere is carried out followed by purifying the annealed diamond particles to remove $sp^2$ carbon from the surface of the diamond particles; and after the purification, sorting the diamond nanoparticles based upon brightness or size.

In certain example implementations, the irradiation is carried out in an air ambient with the temperature of the diamond particles being at least as high as a temperature at which the vacancies diffuse and form fluorescent color centers but not so high as to cause the diamond particles to burn in the presence of oxygen. In certain example implementations, the irradiation is carried out in an inert atmosphere while causing the temperature of the diamond particles to exceed a temperature at which the vacancies start to diffuse and form fluorescent color centers.

In certain example implementations, the dopant may be selected nitrogen, a group of nitrogen atoms, silicon, chromium, nickel and cobalt.

In certain example implementations, the temperature is below a temperature at which vacancies start to move so that irradiated diamond particles contain at least approximately 100 ppm of vacancies; and the process further involves bringing the diamond particles surfaces into intimate contact with at least one external atom corresponding to a dopant element; providing energy to the dopant element for the in-diffusion into diamond lattice and introduction of additional dopants; annealing the diamond particles in vacuum or inert atmosphere for formation of color centers; and purifying the annealed diamond particles to remove $sp^2$ carbon from the surface of the diamond particles.

In another example implementation, a method of processing diamond particles to form fluorescent color centers, is carried out in order: a) providing diamond particles having a diamond lattice and a surface and containing at least one dopant; b) irradiating the diamond particles with high energy radiation in order to create vacancies; c) after irradiating the diamond particles, annealing the irradiated diamond particles in an inert environment at a temperature high enough to cause the vacancies to diffuse and combine with the at least one dopant to form fluorescent color centers; d) after annealing the irradiated diamond particles, purifying the irradiated and annealed diamond particles to remove $sp^2$ carbon from the surface of the diamond particles; and e) repeating b), c) and d) for a total of at least two cycles.

In certain example implementations, the method further involves causing the temperature of the diamond particles during at least one of the irradiations b) to be at least as large as a temperature at which the vacancies diffuse and form fluorescent color centers. In certain example implementations, oxygen is present during the irradiation at b); and further comprising causing the temperature of the diamond particles during at least one of the irradiations at b) to be lower than a temperature which causes burning of the particles in the presence of the oxygen. In certain example implementations, the irradiating is carried out in an inert environment; and where the temperature is higher than a temperature which would cause burning of the particles in the presence of oxygen. In certain example implementations, the diamond particles are mixed while irradiating at b). In certain example implementations, the diamond particles have size in the range of approximately 1 nm to 100 microns. In certain example implementations, the diamond particles have size in the range of approximately 100 to 1000 nm. In certain example implementations, the diamond particles have size in the range of approximately 100 to 300 nm. In certain example implementations, the annealing at c) is carried out at a temperature of approximately 850° C. to 1000° C. for a duration of approximately 1 to 3 hours. In certain example implementations, the purifying at d) comprises oxidizing the $sp^2$ carbon or etching the $sp^2$ carbon using hydrogen.

In certain example implementations, the irradiation at b) comprises irradiating with high energy electrons, protons, ions, neutrons, gamma rays or photons. In certain example implementations, the irradiation at b) comprises irradiating with electrons having energy between approximately 1 MeV and approximately 10 MeV. In certain example implementations, the temperature at b) is caused to be at least a temperature at which vacancies in the diamond particles diffuse to form fluorescent color centers during irradiation by heat generated by the high energy irradiation of the diamond particles. In certain example implementations, the temperature at b) is caused to be at least a temperature at which vacancies in the diamond particles diffuse to form fluorescent color centers during irradiation by heating the diamond particles using a heat source that operates independently of the source of high energy radiation.

In certain example implementations, the temperature is caused to be at least a temperature at which vacancies in the diamond particles diffuse to form fluorescent color centers during irradiation by heating the diamond particles using a heated stage, a heated container or exposure to infrared radiation.

In certain example implementations, after a), but before the irradiation at b) the method further involves i) annealing the diamond particles in a vacuum or inert atmosphere at a temperature of approximately 850° C. to 1000° C. for a duration of approximately 1 to 3 hours; and ii) after i), purifying the annealed diamond particles to remove $sp^2$ carbon from the surface of the diamond particles. In certain example implementations, the annealing at c) is carried out at approximately 900° C. for approximately 2 hours. In certain example implementations, the process further involves fragmenting the irradiated, annealed and purified diamond particles to sizes in the size range of approximately 1 nm to 100 nm, followed by purifying the fragmented particles to remove $sp^2$ carbon and metal impurities from the surface of the diamond particles. In certain example implementations, the fragmenting comprises dry ball milling in a salt matrix; and where the salt to diamond particle ratio exceeds about 2:1.

In certain example implementations, the process further involves after e), surface functionalizing the diamond particles with at least one functional group such as for example carboxylic groups, hydroxyl groups, amino groups, epoxy, polyethylene glycol groups, hydrocarbon chain, hydrocarbon group, an aromatic group, a nucleophile, a thiol, a sulfur, an acid, a base, a fluoro-containing group. In certain example implementations, the process further involves conjugating the diamond particles with or attaching to the diamond particle at least one material such as for example a biological molecule, a nucleic acid, a protein, an antibody, a ligand, a dye, a fluorescent specie, a radioactive specie, a paramagnetic specie, an image contrast agent, a drug molecule and a polymer.

In certain example implementations, the process further involves after e), sorting the diamond nanoparticles based upon brightness or size. In certain example implementations, the dopant is selected from a nitrogen atom, a group of nitrogen atoms, silicon, nickel, chromium and cobalt. In certain example implementations, the irradiation is carried out with the temperature of the diamond particles being at least as high as a temperature at which carbon interstitial atoms diffuse.

In another example implementation, a method of processing diamond particles to form fluorescent color centers, involves in order: a) providing the diamond particles having size in a range of approximately 100 to 300 nm having a surface and having a diamond lattice, and where the diamond particles contain at least one dopant; b) irradiating the diamond particles with electron radiation in order to create vacancies, where the irradiating is carried out using electron radiation having energy between approximately 1 MeV and approximately 10 MeV, while causing a temperature of the diamond particles to be at least as large as a temperature at which the vacancies diffuse and form fluorescent color centers but not so large as to cause the diamond particles to burn in the presence of oxygen; c) after irradiating the diamond particles, annealing the irradiated diamond particles in an inert environment at a temperature high enough to cause the vacancies to diffuse and combine with the at least one dopant to form fluorescent color centers; d) after annealing the irradiated diamond particles, purifying the irradiated and annealed diamond particles to remove $sp^2$ carbon from the surface of the diamond particles by oxidizing the $sp^2$ carbon or etching the $sp^2$ carbon using hydrogen; e) repeating b), c), and d) at least two times; f) after e)

fragmenting the irradiated, annealed and purified diamond particles to sizes in the size range of approximately 1 nm to 100 nm; and g) after f) purifying the fragmented diamond particles to remove sp$^2$ carbon and impurities introduced during fragmenting from the surface of the diamond particles.

In certain example implementations, the process further involves after the purifying at g), and surface functionalizing the diamond particles with at least one functional group such as for example a carboxylic group, a hydroxyl group, an amino group, epoxy, a polyethylene glycol group, a hydrocarbon chain, a hydrocarbon group, an aromatic group, a nucleophile, a thiol, a sulfur, an acid, a base, a fluoro-containing group. In certain example implementations, the process further involves after the purifying at g), conjugating the diamond particles with or attaching to the diamond particles at least one material such as for example a biological molecule, a nucleic acid, a protein, an antibody, a ligand, a dye, a fluorescent specie, a radioactive specie, a paramagnetic specie, an image contrast agent, a drug molecule and a polymer. In certain example implementations, the process further involves after purifying at g), sorting the diamond nanoparticles based upon brightness or size In certain example implementations, the process further involves after a): i) annealing the diamond particles in an inert environment at a temperature high enough to cause the vacancies to diffuse and form fluorescent color centers; and ii) after i) purifying the annealed diamond particles to remove sp$^2$ carbon from the surface of the diamond particles.

In certain example implementations, fragmenting the irradiated annealed purified diamond particles comprises fragmenting by dry ball milling in a salt matrix. In certain example implementations, the irradiation at b) is carried out in an inert atmosphere while causing the temperature of the diamond particles to exceed the temperature at which the vacancies diffuse and form fluorescent color centers. In certain example implementations, the process further involves during the irradiation at b), mixing the diamond particles during the irradiating; and carrying out c), d), e), f), and g).

In certain example implementations, at b) the temperature is below the temperature when vacancies start to move but higher than a temperature at which the interstitials start to move so that irradiated diamond particles contain at least 100 ppm of vacancies; and the process further involves: bringing the diamond particles surfaces in intimate contact with at least one external atom corresponding to a dopant element; providing energy to the dopant element for in-diffusion into diamond lattice and introduction of additional dopants; and carrying out c) and d).

Another method of processing diamond particles to form fluorescent color centers consistent with the present teachings involves providing diamond particles containing at least one dopant; annealing the diamond particles in a vacuum or an inert atmosphere; creating vacancies in the annealed diamond particles by irradiating the diamond particles with high energy radiation; and while the annealed diamond particles are being irradiated, causing a temperature of the diamond particles to be at least a temperature at which vacancies in the diamond particles diffuse and combine with the at least one dopant to form fluorescent color centers. Many variations will occur to those skilled in the art upon consideration of the present teachings.

By use of methods consistent with the present teachings, fluorescent diamond particles can be produced that can be characterized by some or all of the following attributes:

particle sizes ranging from less than 10 nm to 50 nm, more particularly in the range of approximately 6 or 7 nm to 50 nm;

each particle has a plurality of fluorescent color centers with the color centers having at least one dopant atom that is combined with at least one vacancy;

where the fluorescent color centers are predominantly situated in a region within approximately 2 to 3 nm of the surface of the particle (depending on the variations in the process—e.g., when additional doping is produced through in-diffusion of dopants from a surface as described in Example 10);

where the particles exhibit after the additional doping a high percentage of color centers in the region within approximately 2 to 3 nm of the surface of the particle, e.g., between approximately 1 ppm and 1000 ppm of color centers;

where the particles are substantially devoid of sp$^2$ carbon at the particle surface;

the particles have minimal damage to the diamond lattice;

greater overall brightness than commercially available fluorescent diamond particles produced by irradiation with He ions;

containing simultaneously NV and SiV color centers;

nanodiamond particles with sizes less than approximately 20 nm where each particle (100% of the particles) have at least 1 NV center;

an absence of, or minimal amounts of burning of the particles;

particles below approximately 20 nm in size containing approximately 1-100 ppm of color centers with at least one functional group such as for example carboxylic groups, hydroxyl groups, amino groups, epoxy, polyethylene glycol groups, hydrocarbon chain, hydrocarbon group, an aromatic group, a nucleophile, a thiol, a sulfur, an acid, a base, a fluoro-containing group; and particles below approximately 20 nm in size containing approximately 1-100 ppm of color centers conjugated with or attached to at least one material such as for example a biological molecule, a nucleic acid, a protein, an antibody, a ligand, a dye, a fluorescent specie, a radioactive specie, a paramagnetic specie, an image contrast agent, a drug molecule and a polymer.

EXAMPLES

A variety of experiments were performed to demonstrate more efficient production of NV centers in diamond particles as compared to the current approaches. In these experiments, powders of diamond, nanometer sized (nanodiamond) and micron sized diamond particles (microdiamond), were irradiated with an electron beam. The maximum power of the electron beam accelerator was about 100 kW. The electron beam energy could vary between 3 MeV and 4.8 MeV with a corresponding adjustment of the beam current. The full beam scan length was 120 cm. The Al substrate on which the samples were placed had lateral dimensions of about 120 cm×15 cm and was cooled with water circulating inside the plate. The samples of different ND and microdiamond powder were placed on the plate. After dispersing the powder as uniformly as possible, it was pressed to reduce its fluffiness and make better contact with the cooling plate.

Once all of the samples were placed on the cooling plate the plate was covered with Al foil to reduce loss of the diamond powder due to air currents. A few small holes were made along the perimeter of the foil for gas release (the released gas is composed of surface groups desorbed from diamond particle surfaces as well as released adsorbed molecules) during conditioning of the samples. Irradiation runs started with conditioning of the samples comprising irradiation at certain beam currents lower than the planned maximum beam current for a few minutes: 15 mA for 10 minutes; 20 mA for 10 minutes; then 30-33 mA run for few hours (for example, for 20 hours to achieve a $2.5 \times 10^{18}$ e/cm$^2$ total dose). When samples of 100 nm particles were wrapped in Al foil for irradiation, within seconds after beginning the irradiation the foil became inflated with gases. This caused damage of the foil and burned the diamond samples. It is assumed that irradiation with electrons strips off surface functional groups from diamond particles and causes the release of adsorbed molecules both of which are released as gas. In the case of nanodiamonds, due to the large specific surface area, the amount of gas released is quite substantial.

In order to avoid quick release of a large amount of gas formed by desorbed surface groups and adsorbed molecules, a gradual increase of the current resulted in slower gas release which could escape through the perforated holes resulting in better sample preservation during irradiation. After conditioning, the approximately 3-4" diameter beam with 30-33 mA current was scanned along the plate at a frequency of 100 Hz until a targeted dose was achieved.

The experiments below show how the efficiency of NV centers production can be improved over the current state of the art. Measurements of photoluminescence of diamond particles were done using a Princeton Instruments Isoplane SCT320Spectrograph and PIXIS 100 CCD camera. The excitation wavelength was 514 nm, laser power at the sample 100 mW, exposure time 100 ms, 10 exposures per frame, grating 150 g/mm, blaze 500 nm, center wavelength 711 nm. Measurements were done for 0.1 wt % diamond particle slurry in deionized (DI) water. All brightness comparison with Atto dyes were made by a third party. Many variations will occur to those skilled in the art upon consideration of the present teachings.

Working Example 1. Treatment of Diamond Powder Before Irradiation

In the course of the experiments it was discovered that certain treatment of diamond powder before electron irradiation can increase the density of NV centers and fluorescent intensity. One such treatment included treatment of diamond powder in vacuum at 850-950° C. for 1-3 hours. Another treatment included sample purification to remove sp$^2$ carbon.

Experiments were done with samples S1 and S2 which were 100 nm ND powders from Kay Diamond Products, Florida irradiated to the same dose. Sample Si was treated at 850° C. for 2 hours in vacuum which resulted in the formation of a surface graphitic layer which was removed by oxidization by heat treatment in air at 550° C. for 2 hours. Sample S2 was used as purchased, without pre-treatment. After irradiation to 2.5E+18 e/cm$^2$ dose sample S2 which had not undergone preliminary vacuum/air treatment, had a blackish color, while sample Si still had a greyish color. Thus overall graphitization of the material after irradiation was higher for non-purified diamond (sample S2). While not being bound by theory, it is believed possible that the islands of starting graphitic material present on ND surfaces plays a role of centers of enhanced graphitization during irradiation. The pre-irradiation treatment resulted in approximately 10% material loss, but at this stage this loss is acceptable taking into account that this treatment reduces losses further along in the process during irradiation. The cost of the HPHT 100 nm starting material is low (few dollars per gram at the time of this writing) compared to the cost of processing so it is more cost effective to accept early losses of inexpensive material to avoid loss of more costly material later.

The pre-irradiation vacuum annealing procedure also generates some amount of NV centers from vacancies available and single N centers in the as-purchased sample, so that low red fluorescence can be seen in an inverted fluorescent microscope (Olympus) for example by imaging 100 nm Kay ND after the vacuum/air treatment. This effect is even more pronounced for micron sized diamond. After the vacuum/air treatment even before irradiation the fluorescence of micron sized diamond is seen relatively well in the fluorescent microscope.

Figure 3:
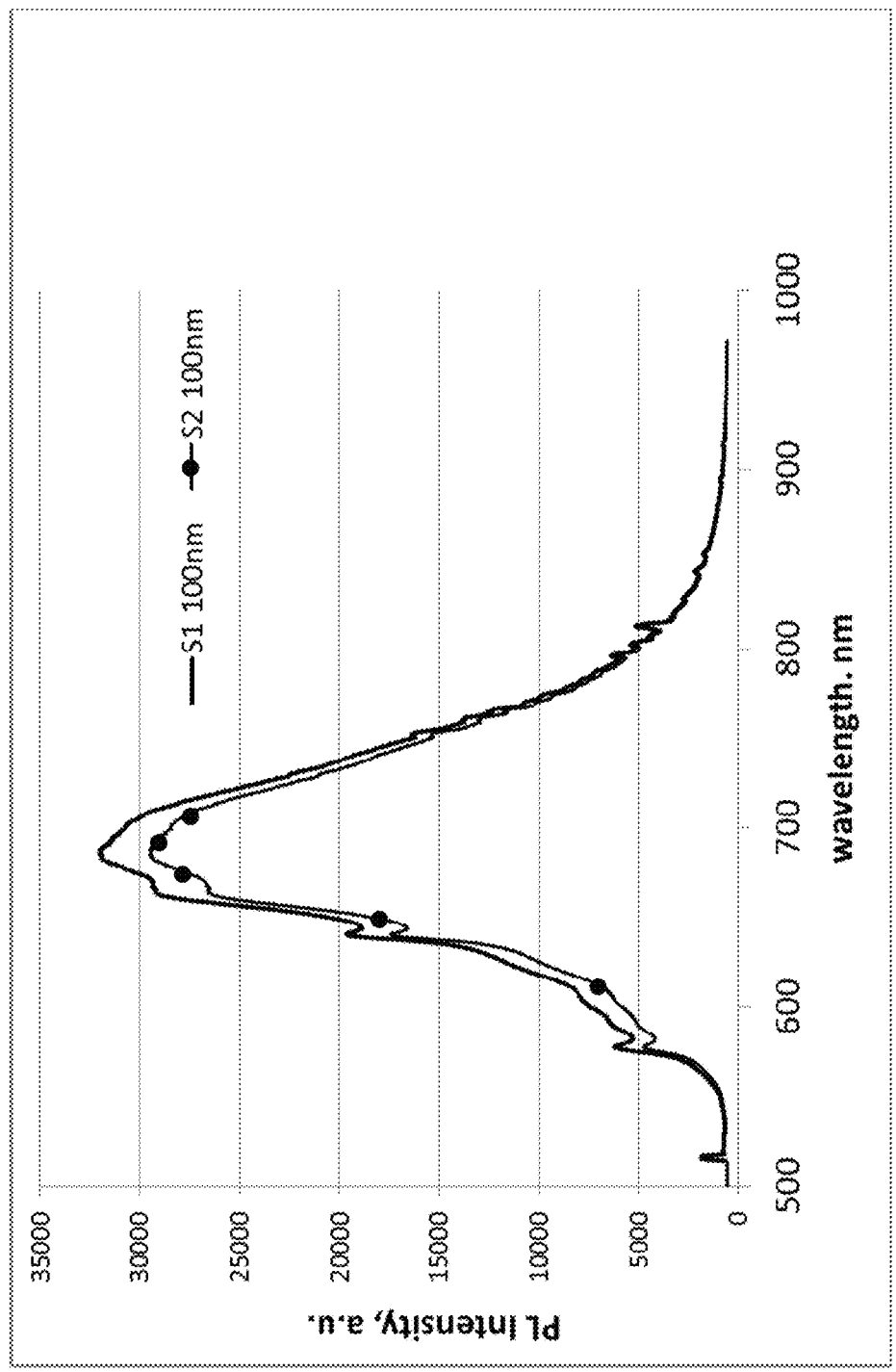
FIG. 3 is an example showing photoluminescent spectra resulting from the experiments of Example 1 in a manner consistent with certain example embodiments of the present invention.

Surprisingly, in addition to reducing loses during irradiation, sample Si had higher PL intensity as compared to sample S2 after similar treatment after irradiation. After irradiation both samples underwent annealing in vacuum at 900° C. for 2 hours, followed by annealing in air at 500° C. for 2 hours. This is illustrated in FIG. 3 which shows the photoluminescent spectra of samples S1 and S2, 100 nm ND powders irradiated to the same dose (2.5E+18 e/cm$^2$). Sample S1 underwent pre-irradiation treatment: it was treated at 850° C. for 2 hours in vacuum and then oxidized by heat treatment in air at 550° C. for 2 hours. Sample S2 was used as purchased, without pre-treatment. PL spectra were taken for 0.1 wt % slurries in DI water at excitation 514 nm.

Working Example 2. Stripping of Groups in Vacuum Before Irradiation

As it was described above, formation of gases was observed at the beginning of irradiation which created pressure build-up within the container if the ND particles were encapsulated in a gas tight enclosure during the irradiation process. It was assumed that the irradiation with electrons strips off surface functional groups from diamond particles and causes desorption of adsorbed molecules, processes which are enhanced by the temperature increase due to beam heating. In order to avoid the quick formation of a large amount of gas by desorbed surface groups and released molecules that can damage the enclosure or package holding the samples, it is possible to perform a preliminary thermal desorption of surface groups/adsorbed molecules in vacuum (at 500-600° C., no graphitization is induced). Different surface groups and adsorbed molecules can be desorbed at different temperatures. For example, carboxylic groups can be desorbed by heating in vacuum at about 200° C. to 400° C.

The following experiment was conducted. A sample of 100 nm ND was treated at 850° C. for 2 hours in vacuum and then the formed surface graphitic layer was oxidized by heat treatment in air at 500° C. for 2 hours. The sample had a light grey color. Then the sample was treated at 600° C. for 2 hours in vacuum. Its color remained grayish. The sample was encapsulated with Al foil and irradiated with a high energy electron beam. Inflation of the foil was significantly reduced as compared to the sample which had not undergone treatment in vacuum at 600° C. before the irradiation.

Working Example 3. Irradiation with Different Particle Sizes

One strategy for improving NV yield and increasing NV density involves a careful choice of the size of material to be irradiated. Crystals larger than about 100 nm can be used as the starting material to increase the overall yield of NV centers. The size range of ND used for irradiation should be about 100-1000 nm and more preferably about 100-300 nm. This allows for the larger particles with a high density of NV centers to be fragmented to particles with smaller sizes. For example, bead milling and fractionation by centrifugation can be used to obtain fractions with different particle sizes.

Figure 4:
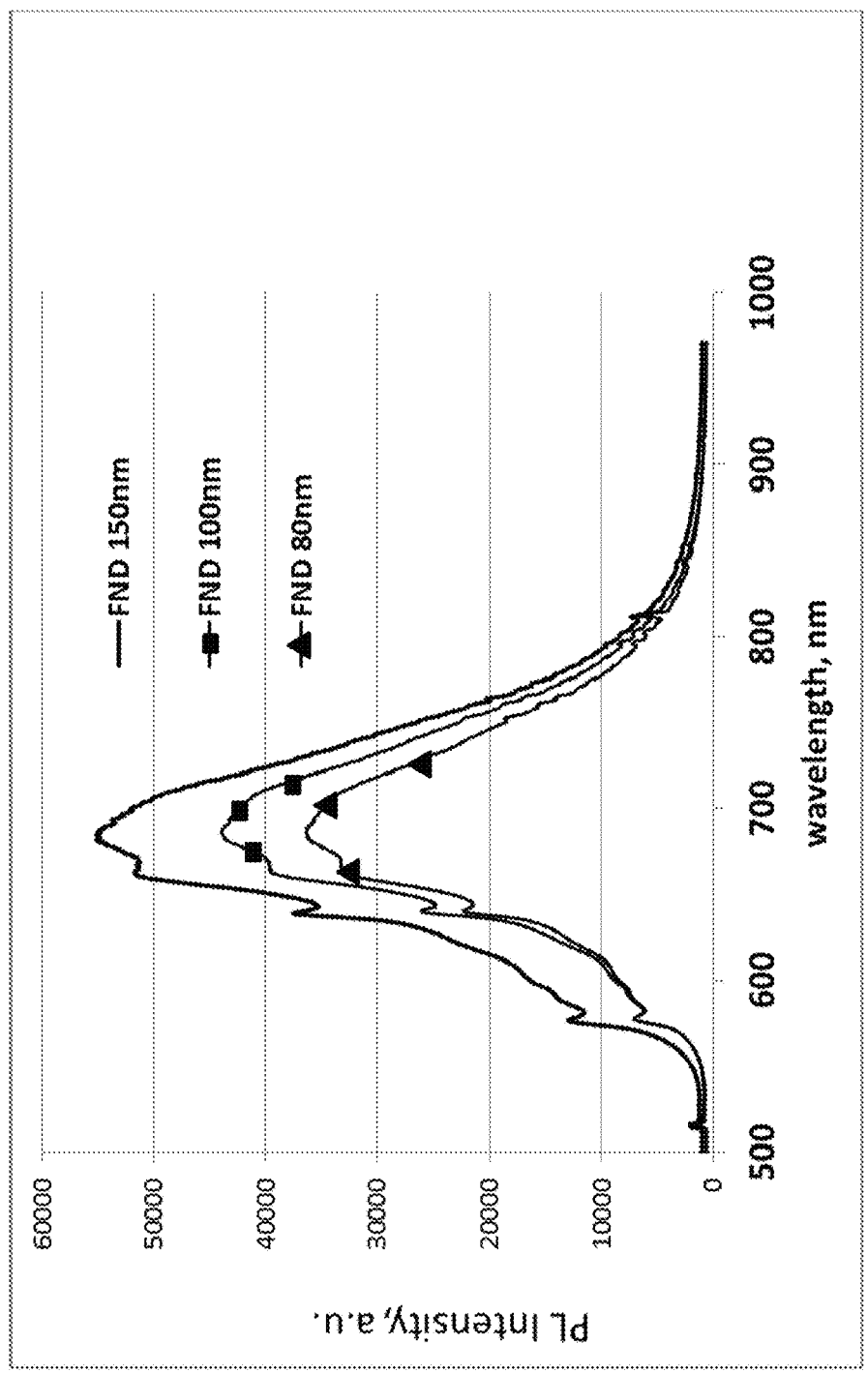
FIG. 4 depicts spectra resulting from the experiments of Example 3 consistent with certain example embodiments of the present invention.

In this series of experiments diamond particles with different sizes were irradiated: 150 nm, 100 nm and 80 nm average particle size. FIG. 4 illustrates the PL spectra of a 0.1 wt % slurry of ND particles in DI water. It can be seen that particles with larger size irradiated to the same electron irradiation dose have higher overall brightness, indicating a higher density of created NV centers. Photoluminescent spectra were taken for ND particles with different average particle sizes (150 nm, 100 nm and 80 nm) irradiated to the same dose (5E+18 e/cm$^2$). Samples underwent pre-irradiation treatment (850° C. for 2 hours in vacuum and 500° C. for 2 hours in air). Irradiation was done in two iterations (2.5E+18 e/cm$^2$ dose for each). Between the irradiations, samples were treated at 850° C. for 2 hours in vacuum and 500° C. for 2 hours in air. After irradiation samples were treated at 900° C. for 2 hours in vacuum and 500° C. for 2 hours in air. PL spectra were taken for 0.1% slurries in DI water at excitation 514 nm.

Working Example 4. Role of Intermediate Annealing Between Irradiation Steps

Figure 5:
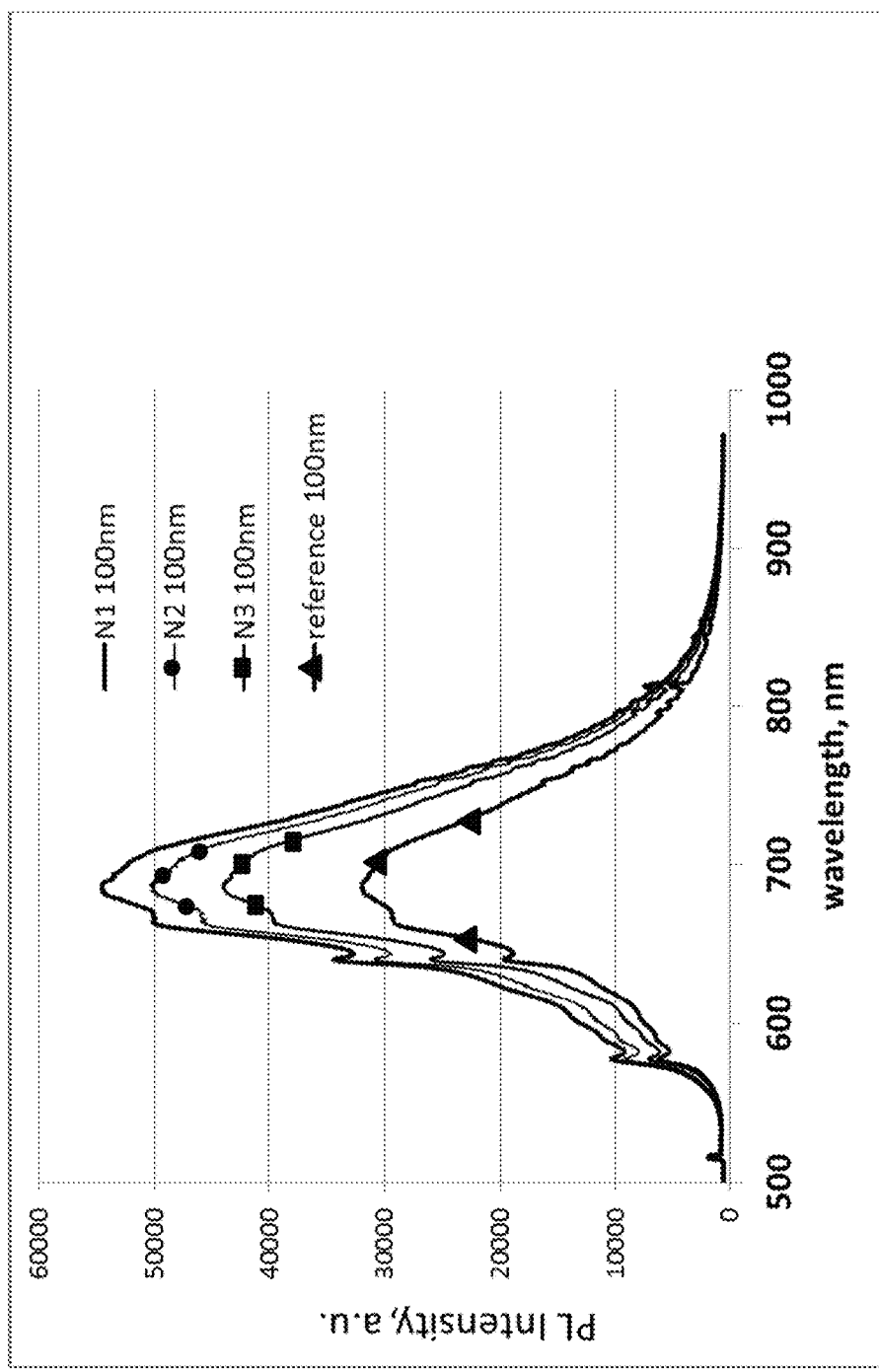
FIG. 5 shows spectra for example processing as described in Example 4 in a manner consistent with certain example embodiments of the present invention.

One series of experiments included annealing and purification of the NDs between irradiation runs with the goal of formation of NV centers at intermediate stages during irradiation. This procedure helps to avoid build-up of an excessive concentration of vacancies which can be merely lost at vacancies stocks and can form unwanted bivacancies and vacancy clusters if a targeted high dose is delivered within a single run. Damage of the ND lattice can be also minimized using this approach. Using material irradiated in a single run as a reference material, it was clearly demonstrated that the intermediate annealing steps between irradiation steps resulted in a material with noticeably higher brightness for the same cumulative dose of irradiation. FIG. 5 illustrates comparative PL intensities for the samples N1, N2 and N3 (see accompanying TABLE 1 which summarizes treatment of the samples N1, N2 and N3 for which PL spectra is illustrated in FIG. 5) annealed in vacuum and purified in air. All of these samples underwent the same irradiation dose of 4.85E+18 e/cm$^2$. Samples N1 and N2 were subjected to intermediate annealing between irradiations but sample N3 did not in order to reveal the possible role of such annealing. Sample N1 was additionally annealed and purified before the first irradiation. It can be seen from FIG. 5 that this new procedure worked well and clearly shows steady improvement as the number of vacuum/air treatments of the samples is increased. Brightness of samples N1 and N2 are measured to be about 20% and 12% higher respectively than that of the untreated sample N3. With a higher accumulated radiation dose, the difference is expected to be even more dramatic.

TABLE 1

| sample | Vacuum/air (850° C./ 500° C.) | Irradiation-1 2.5E+18 | Vacuum/air (850° C./ 500° C.) | Irradiation-2 2.5E+18 | Vacuum/air (900° C./ 500° C.) |
|---|---|---|---|---|---|
| N1 | + | + | + | + | + |
| N2 | − | + | + | + | + |
| N3 | − | + | − | + | + |

Spectra for 100 nm commercial sample was used for a reference (type brFND-100 purchased from Institute of Atomic and Molecular Sciences, Academia Sinica, Taipei, Taiwan (biodiamond.url.tw) with stated "number of NV centers per particle: >500" is also illustrated in FIG. 5 and shown as "reference 100 nm". PL spectra were taken for 0.1 wt % slurries in DI water at excitation 514 nm. While the reference sample is advertised as having between 5 and 1000 ppm of color centers, it is believed to be highly improbable that the number of color centers exceeds 5 to 10 ppm. The samples purchased exhibited approximately 5 ppm color centers. The reference sample has exhibited brightness that is approximately 6.9 times brighter than Atto 532 dye (tests conducted by a third party), while sample N1 is about 1.7 times brighter than the reference sample and thus about 11.7 times brighter than Atto 532 dye. This suggests that sample N1 has a greater number of color centers than the reference sample.

By use of the process according to the present teachings, the overall radiation dose can be lower than would otherwise be used to achieve a given level of fluorescent intensity. This substantially decreases the cost of producing the fluorescent NDs. Alternatively, for the same allocated cost of irradiation higher brightness can be achieved.

Working Example 5. In Situ Formation of NV Centers in Diamond Powder by Sample Heating During Irradiation For in situ formation of NV centers during irradiation, the temperature should be high enough to ensure vacancy diffusion. Interestingly, it was discovered that heating might not require a special set up and can be realized, as one of the options, through powder heating with the electron beam, as was observed in our experiments. Beam heating (a function of beam power) and cooling rate within the cooling plate can be balanced to realize the optimal temperature for NV formation during irradiation.

Diamond powder of 15-20 micron size from Diamond Innovations (aerial powder density (about 2.1 g/cm$^3$), USA was used in these experiments. Based on information from Diamond Innovations, the single substitutional N (Ns) content is about 150 ppm. Powder was placed on a cooling plate at a thickness 2 mm to 2.5 mm and irradiated with electrons as described above for a period of 20 hours (at 33 mA) to a dose 2.5E+18 e/cm$^2$. After irradiation the initially yellow micron sized powder (yellow due to Ns) became green, which is a sign of the presence of vacancies. Surprisingly, part of the powder on the top had a pinkish color.

Figure 6A:
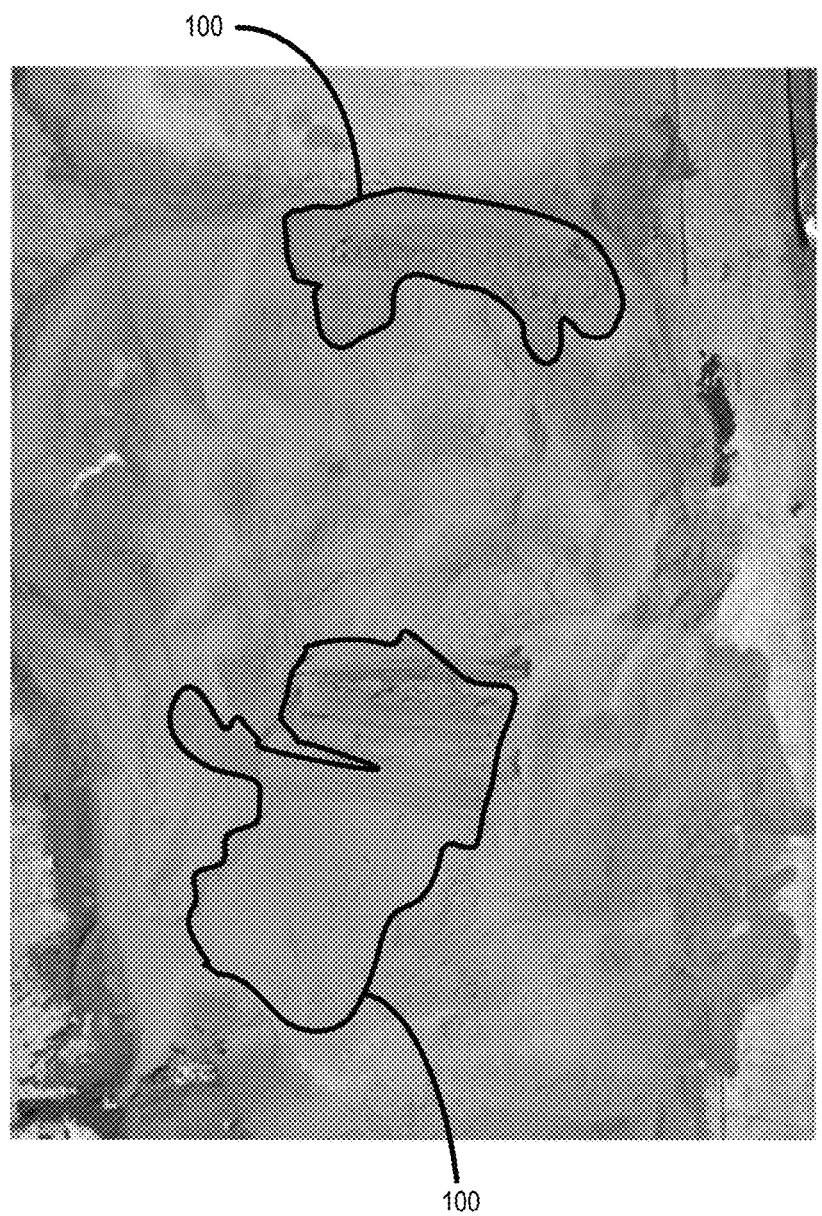
FIG. 6, which is made up of FIGS. 6A and 6B, shows color and black and white photographs respectively for the example processing as described in Example 5 consistent with certain example embodiments of the present invention.

In FIG. 6A, an image of the micron diamond samples after about 18 hours of irradiation at 33 mA (2.5E+18 e/cm$^2$ dose) is shown. Purple spots correspond to the most prominent of the purple regions 100 shown approximately as the outlined area that are purple colored as a result of NV centers formation during irradiation. The same outlined area is shown in the gray scale image of FIG. 6B. The purple regions 100 are associated with in situ formation of NV centers due to irradiation in the presence of high temperature (beam heating of the powder), allowing movement of vacancies.

Figure 6B:

FIG. 6A is a photomicrograph of diamond samples after preparation of diamond particles according to the present Example 5. This photograph evidences the presence of nitrogen vacancy (NV) centers formed during the process. The purple areas are a result of presence of the NV centers, but the purple colors vary in intensity in a manner that cannot be fully captured when the image is depicted in black and white as shown in FIG. 6B (which is an enhanced image converted from FIG. 6A). Note that there are areas of relatively intense purple color in the regions 100 that are outlined, but there are also lighter colors of purple that are visible in many other regions of the image.

In the places where pink powder was observed, the powder was thicker than 2.5 mm creating a higher local temperature, as compared to the places where green powder was located. In the top cross-section with larger thickness there was less heat removal so that these spots reached temperatures high enough for vacancies to start to diffuse and form NV centers, resulting in the pinkish coloration. The thickness of the layer of pink powder on the top was about 1 mm. Underneath the cross-sectional layer of pinkish powder, in the regions closer to the cooling plate the powder was green as a result of greater heat removal (thus, the temperature did not rise high enough for vacancies diffusion).

The pink and green powders were collected separately. These two powders underwent similar post-irradiation processing: post-irradiation annealing (900° C. for 2 hours.) and purification in air (500° C. for 2 hours). Inspection in a fluorescent microscope (Olympus) indicated that the powder that became pink during irradiation has brighter photoluminescence than powder that was green after irradiation. In this powder, part of the NV centers was formed during irradiation and part during post-irradiation annealing, providing an overall higher density of NV centers. The coloration of micron sized diamond has been found to be a very specific indicator that NV formation took place during irradiation due to internal heating of the sample by the electron beam.

Therefore, it can be concluded that heating/annealing during irradiation is an approach which can provide a higher yield of NV centers. This can be especially significant when one wants to reach the highest possible yield of NV centers when very high irradiation doses are required which, however, create lattice damage and formation of clusters of vacancies. Heating during irradiation helps to mitigate these defects and achieve higher yield of NV centers than irradiation at low temperature.

In the current example, irradiation was done in the presence of oxygen from air and ozone (formed during electron irradiation of oxygen). Heating at such conditions to temperatures exceeding approximately 650-700° C. would result in combustion of micron sized diamond particles. However, if irradiation were performed in an inert atmosphere (for example, nitrogen), the temperature could be increased to about 900-1000° C. without damage to the diamond particles, while further facilitating formation of NV centers during irradiation.

Working Example 6. In Situ Formation of NV Centers in Nanodiamond Powder by Sample Heating During Irradiation Nanodiamonds do not have specific coloration like micron-sized diamonds due to light scattering from the large surface area of the ND. However, in situ formation of NV centers during irradiation at specific conditions due to sample heating took place for nanodiamonds too. ND powder (100 nm average particle size) was dispersed over a cooling plate as separate layers with different thicknesses, 1.5 mm and 2 mm, and both layers were irradiated to the same dose. The powder at the top of the 2 mm thick layer was slightly burned. Samples were collected from the top of both layers and annealed at 500° C. for 2 hours to remove $sp^2$ carbon from the surface of the diamond particles (note that no post-irradiation annealing was performed to check if NV centers were formed during irradiation). Inspection in the fluorescent microscope revealed that ND that was at a higher temperature, at the top of the 2 mm layer, exhibited red luminescence indicating NV centers formation during irradiation.

Heat removal was more efficient and the resultant temperature was lower for the thinner powder layer (1.5 mm thick powder). Following irradiation this powder showed much less luminescence when inspected in the fluorescent microscope. Irradiation in a non-oxidizing atmosphere (inert gases) would allow the ND powder to reach even higher temperatures without burning and produce a larger amount of NV centers during irradiation due to heating above approximately 600° C. It is possible that in the presence of electron beam irradiation vacancy diffusion is enhanced so that the temperature when vacancies diffuse and form NV centers can be lower than 600° C. (perhaps about 500-550° C.). Besides internal heating due to irradiation with an electron beam, external or auxiliary heaters can be used.

Working Example 7. Role of Temperature of Post-Irradiation Annealing and Purification The annealing temperature for ND for efficient creation of NV centers, if properly chosen, can reduce the time required for electron irradiation in order to achieve the targeted brightness for NDs.

For low irradiation doses (about $10^{17}$ e/cm$^2$) a comparison was made of NV formation in 100 nm HPHT starting samples when annealed at 850° C. versus 900° C. and a noticeable difference was observed in the amount of NV formed in favor of the use of 900° C.

After irradiation to 2.5E+18 e/cm$^2$ dose, annealing studies were carried out in more detail. Annealing in vacuum was performed for FND at 900° C. for 2 hours, 900° C. for 1 hour., 950° C. for 2 hours. Annealing of ND powders was done in a Carbolite vacuum furnace. NDs were spread over alumina boats (2"×6") as a thin layer. Then samples were purified by heating in air at 500° C. for 2 hours and then treated in acids. All samples underwent a similar purification procedure. The sample treated at 950° C. had more dark color after treatment and showed higher material loss (by about 7%) after purification, which is expected since a larger portion of the material underwent graphitization during the vacuum annealing.

Figure 7A:
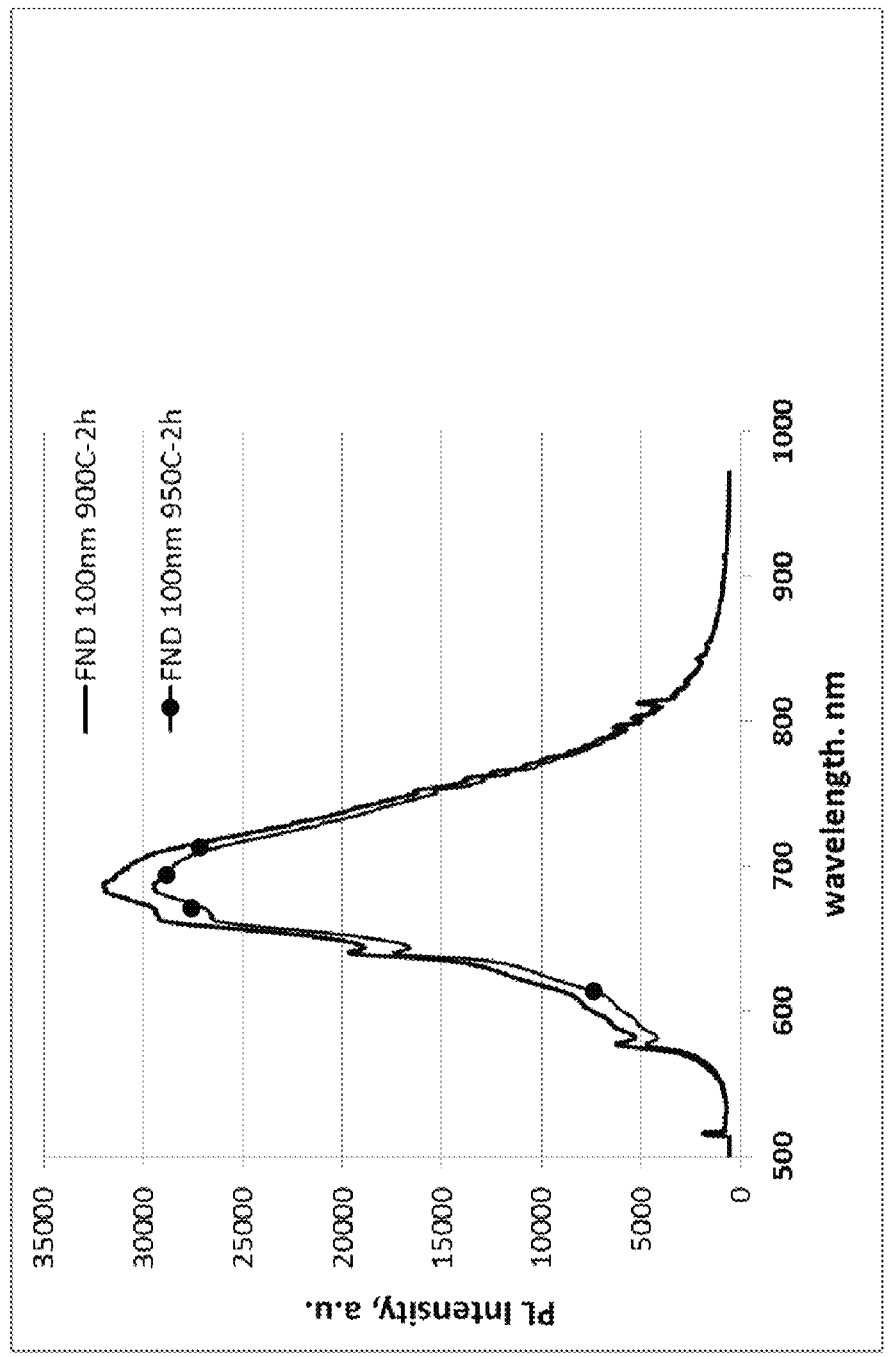
FIG. 7, which is made up of FIG. 7A and FIG. 7B, shows PL intensity for 100 nm and 80 nm FND samples treated as discussed in connection with Example 7 which are consistent with example embodiments of the present invention.
Figure 7B:
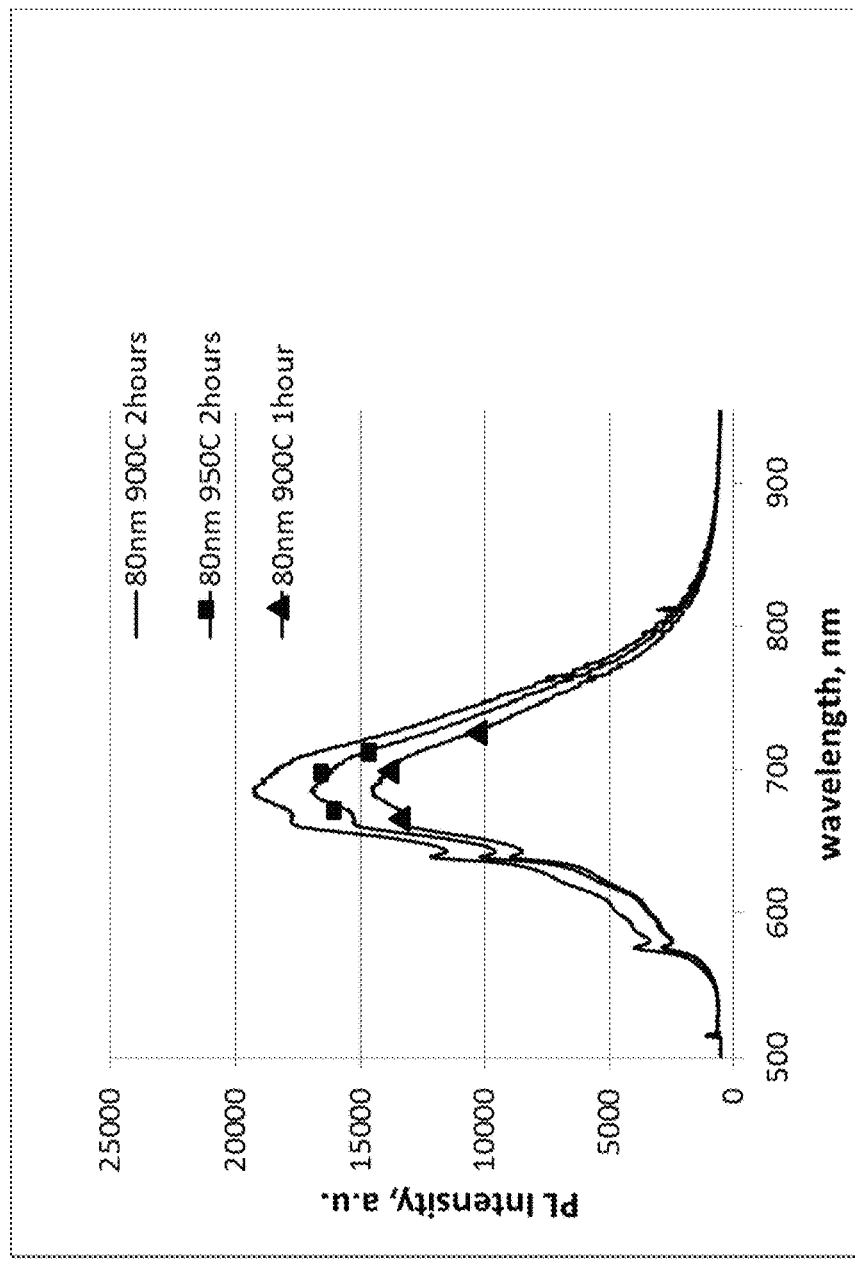

PL intensity for the FND samples annealed in vacuum at different temperatures for different durations shown for 100 nm samples irradiated to 2.5E+18 e/cm$^2$ dose, annealed in vacuum at 900° C. or 950° C. for 2 hours and purified in air at 500° C. for 2 hours and then treated in acids are shown in FIG. 7A. Spectra for 80 nm samples irradiated to 2.3E+18 e/cm$^2$ dose, annealed in vacuum at 900° C. for 2 hours, 900° C. for 1 hour or 950° C. for 2 hours and purified in air at 500° C. for 2 hours and then treated in acids are shown in FIG. 7B. Spectra were taken for 0.1 wt % slurry in DI water at excitation 514 nm.

From FIG. 7 it can be concluded that the optimal annealing in vacuum is at approximately 900° C. for approximately 2 hours. This result was obtained for 100 nm and 80 nm NDs and might be different for other ND particle sizes. It is expected that any size dependent difference would not be significant. Optimal temperature can be obtained in the manner described above.

Post-irradiation purification from $sp^2$ carbon followed post-irradiation high temperature annealing for creation of NV centers. During annealing in vacuum at 850-950° C. a graphitic layer was formed on ND surfaces that should to be etched away since the presence of a graphitic phase on the ND-NV surface quenches the photoluminescence.

The choice of the temperatures for vacuum annealing and treatment in air depended on the amount of the material that could be lost during such treatment versus higher PL properties acquired due to such treatments. Systematic analysis of the material lost after vacuum/air treatments was performed. Losses during vacuum treatment itself were very insignificant. The losses at annealing can be attributed to desorption of the surface groups and desorption of adsorbed gases and possible loss of the powder during the evacuation/de-vacuum processes. However, the temperature of the vacuum annealing influences the degree (amount) of ND converted to the graphitic phase and consequently the amount of material lost during the subsequent air treatment. After oxidation of the graphitized layer at 550° C. in air, total losses of the treated material constitute about 20%.

While it is an acceptable loss at the preparation stage for inexpensive starting powder such as Kay diamond powder, it is desirable to reduce the loss of the very expensive material that results from the cost associated with irradiation. The temperature of air treatment can be reduced to 500° C. (or 450° C.), but the color of the treated material becomes more and more dark-greyish as the temperature is reduced, indicating higher content of the graphitic phase that in principle will quench the luminescence. It was also demonstrated that annealing at 900° C. in vacuum and 600° C. in air provided the brightest PL ND-NV of the experiments conducted. However, this treatment resulted in the loss of more than 30% of the material.

Decreasing the treatment temperature in air from 550° C. to 500° C. significantly reduced the loss of material during oxidation (from about 20% down to about 6-7%). At the same time, 4 hours of treatment at 500° C. almost doubled the total losses. Diamond is oxidized during air treatment at high temperature. Therefore, 2 hours of treatment for the processing was used.

After vacuum and air treatment the material was treated in acids for the purpose of further reducing the $sp^2$ carbon content and carboxylation of the ND particles surfaces. NDs were treated in a mixture of sulfuric/nitric acids (3:1) for 4-6 hours at a temperature exceeding 100° C. Due to this treatment, the brightness of ND-NV increased by approximately 5-10% as confirmed by PL measurements.

Working Example 8. Production of 10-20 nm FND

Production of 10-20 nm FND with maximum possible brightness is very appealing for molecular level imaging. For production of 10-20 nm FND both fragmentation of larger particles and fractionation was used. Since irradiation of small ND (at least smaller than 60-70 nm) is not effective and does not provide the highest possible density of NV centers, larger diamond particles with the highest possible density of NV centers can be produced and fragmented into smaller particles and then separated by size.

Milling experiments were performed using a Retsch 400 planetary mill. Milling of a 1 wt % water slurry of 170 nm diamond particles with 300 um zirconia beads for 1 hour did not show significant reduction in particle size (this regime has been found to typically show good deagglomeration of detonation ND). Since monolithic diamond particles would require an impact load for their crushing rather than creation of shear forces needed for deagglomeration of tight agglomerates of detonation ND, dry ball milling with large heavy balls was used to provide a high impact load (versus shear forces created by micron size beads in slurries). This approach was successful. Both 15 mm and 5 mm zirconia balls were used. It was concluded that using 15 mm versus 5 mm zirconia balls results in more efficient dry milling. Milling was performed in 50 ml zirconia jars using a planetary mill. A method of ball milling of HPHT diamond was also developed comprising milling of diamond crystals in a crystalline matrix (called matrix-assisted milling). In this case a crystalline matrix material (such as salt—NaCl) was mixed with diamond powder before milling and dry ball milling with 15 mm balls was performed. In example experiments, good fragmentation of the diamond particles was achieved using dry ball milling in a salt matrix where the salt to diamond particle ratio exceeded about 2:1. After matrix-assisted dry milling for 1 hour, 170 nm diamond particles were milled to a powder having average particle size of 40 nm.

Figure 8A:
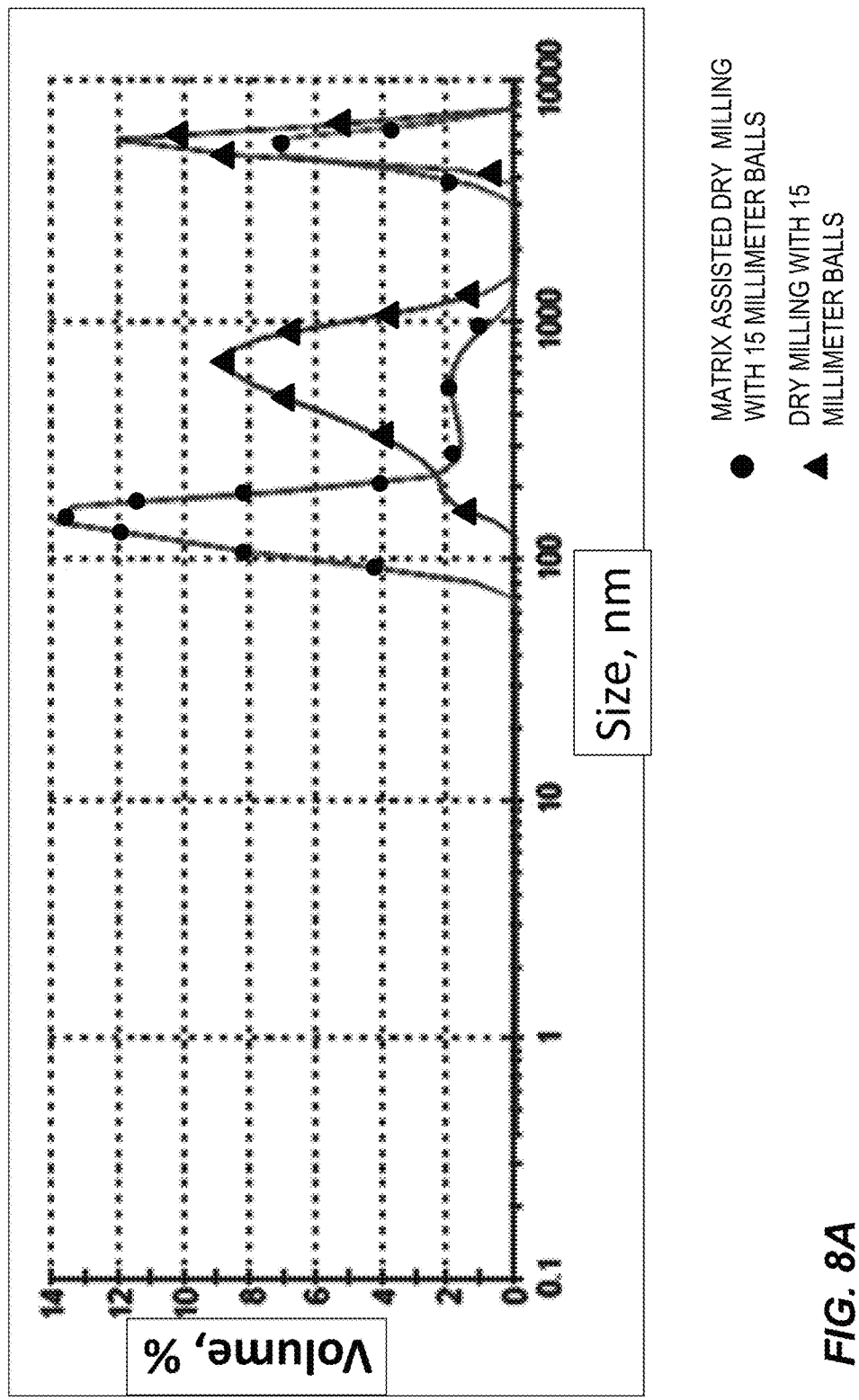
FIG. 8 which is made up of FIG. 8A
FIG. 8B shows results of ball-milling of fluorescent diamonds as described in connection with Example 8 consistent with embodiments of the present invention.
Figure 8B:
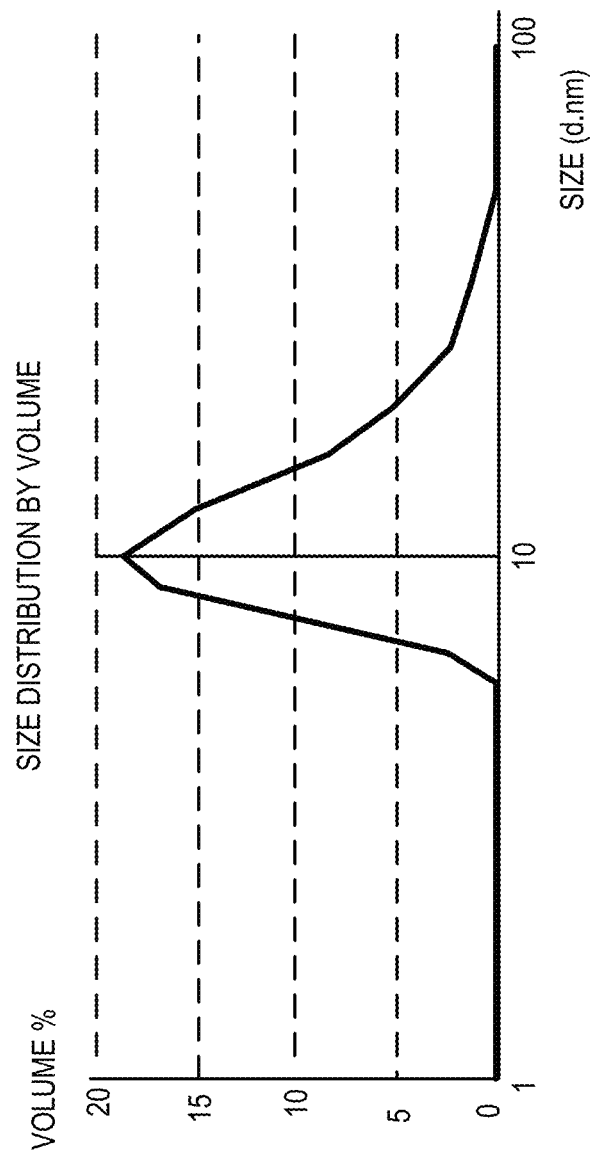

FIG. 8A shows volumetric particle size distribution of fluorescent diamonds particles produced following ball-milling of 15 micron sized particles for 2 hours using regular dry milling with 15 mm balls (triangles) and matrix-assisted dry milling (circular dots). FND with 15 micron size was produced by irradiation of 15 micron sized diamond powder from Diamond Innovations, Inc. to a dose 2.5E+18 e/cm², followed by annealing at 900° C. for 2 hours, followed by purification in air (550° C. for 2 hours) and treatment in acids. Then the particles were fragmented using matrix assisted milling described above. The particle size distribution was measured for particles dispersed in DI water by the dynamic light scattering technique using a Malvern Zetasizer Nano ZS instrument. It can be seen that the material milled using the matrix-assisted method has a large peak near 150 nm, while the material milled in a regular dry milling process has a large peak in the vicinity of 700 nm. From the matrix assisted milled diamond, a high yield of 40 nm fraction can be extracted by fractionation using centrifugation, from which a 10 nm fraction was extracted by centrifugation. Particle size distribution for 10 nm fraction of FND as measured for particles dispersed in DI water by dynamic light scattering technique is shown in FIG. 8B. Inspection of the 10 nm FND slurry under an inverted fluorescent microscope (Olympus) showed that the particles possess strong red fluorescence. Using this approach, it is possible to produce larger particles (larger than approximately 100 nm) with the highest possible brightness and then fragment them to FND particles smaller than 20 nm and even smaller than 10 nm with highest possible brightness.

FIG. 9A is a micrograph of the fluorescent diamond particles with an initial size of 15 micron milled using the matrix-assisted ball milling process. FIG. 9B is a conversion of FIG. 9A to a black and white image. The micrograph is taken with an inverted fluorescent microscope Olympus. Original undamaged 15 um particle can be also seen in the micrograph as a reference. It can be also seen from the FIG. 9 that small fragments of the 15 um particles also have bright fluorescence. The micrograph of FIG. 9A is a photomicrograph of particles as created in Example 8. The image shows the red fluorescence resulting from the excitation of the color centers created in the process of Example 8. The image has been converted to black and white and enhanced as FIG. 9B to better illustrate the number of color centers by use of greater contrast. While FIG. 9B provides a good representation of the presence, quantity, size and location the color centers, the red colors provided in FIG. 9A are more illustrative of the characteristics of the resultant particles. It is possible to use other crystalline matrices in this method, besides NaCl.

Prothetic Example 9. Selection of FND Based on their Brightness

Figure 10:
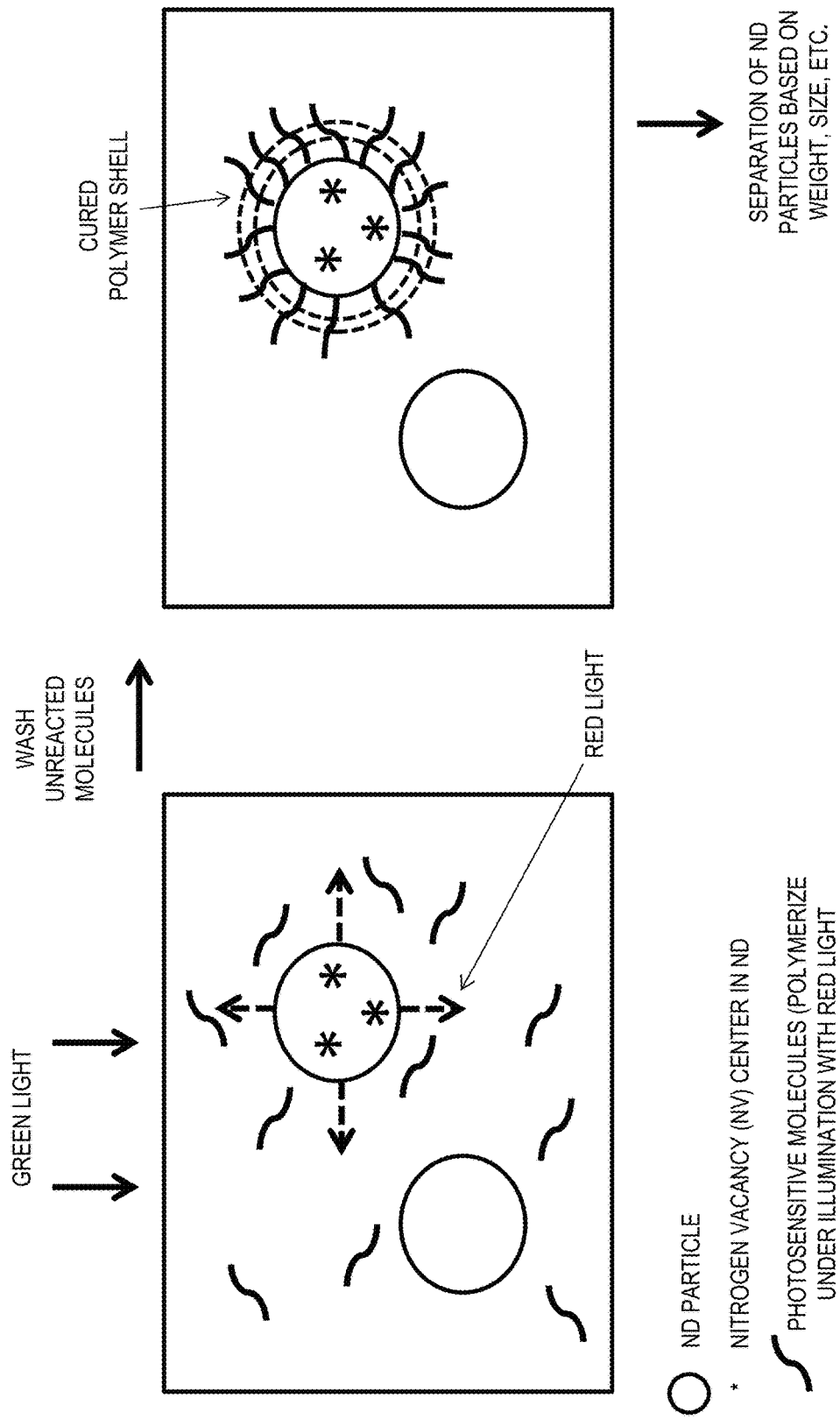
FIG. 10 is a depiction of an example process of an embodiment consistent with the present invention.

There can be several approaches for FND selection by brightness based on FND emitting red light and activating a surrounding photosensitive media. Red emission by FND can be excited by an external source of green radiation. Depending on the brightness of individual particles the degree of photochemical or photothermal activation of the surrounding photosensitive molecules will vary. For example, photopolymerization can take place near FND particles emitting red light (FIG. 10); the degree of photopolymerization will depend on the intensity of the emitted light. Thus, polymer shells with different thicknesses can be formed around FND particles depending on their brightness. FNDs encapsulated into cured polymer shells with different thickness will have different mobility in external fields, for example, in a gravitational field, electric field, etc. and can be separated by centrifugation, gradient density centrifugation, electrophoretically, chromatographically and by other suitable mechanisms. The concentration of FND and photosensitive molecules for the best efficiency can be experimentally determined. The optimal time of illumination and composition of the suspension containing FND and photosensitive molecules can also be experimentally determined.

A feature of this approach is that it is readily scalable. Two photoinitiators were identified—H-Nu 660 and H-Nu 780 from Spectra Group Limited, Inc. which, when mixed with a solution of acrylic monomers and irradiated with either red (H-Nu 660) or far-red (H-Nu 780) light, trigger curing of a wide range of acrylates via a free-radical mechanism. The absorption spectra of the initiators have peaks at 660 nm and 780 nm for H-Nu 660 and H-Nu 780, correspondingly. Packages for evaluation of performance of the photoinitiators also contain Borate V co-initiator in the amount matching that of the H-Nu photoinitiator itself. Borate V helps to control the time of polymerization which can be in the range of seconds to minutes. Photoinitiator and co-initiator are pre-dissolved in N,N-Dimethylacrylamide (DMAA). FND can be dissolved in a solvent compatible with the acrylic resin (for example toluene) and mixed with the acrylic monomer and photoinitiator. The mixture is irradiated with green light under stirring. After specific time intervals, the green light is turned off and non-reacted monomer washed out. After several washing cycles FND-acrylic particles are dispersed in a solvent where they maintain colloidal stability and are fractionated by centrifugation according to the thickness of the polymer shell (diameters of the particles) into fractions with different thickness of polymer shells (and therefore different brightness of the FND encapsulated into the shells). Thermogravimetric (TGA) analysis of different fractions helps to determine the amount of polymer in the polymer shells. The polymer can be removed by dissolving in acids or burning in air at about 500° C. The ensemble brightness of different fractions can be measured using a spectrophotometer.

Prothetic Example 10. Increase Number of NV Centers by Additional N Doping

One approach to improving brightness uniformity is to realize conditions of additional doping of ND particles with N, by bringing N into intimate contact with ND particle surfaces and creating conditions for the in-diffusion of N atoms to the diamond lattice. ND with a high concentration of vacancies can be used for doping so that N atoms can be more readily incorporated into the existing vacancies. This is believed likely to facilitate this effect.

One approach is based on the knock-on effect. An assumption is that if the chemical element (N in this case) is brought into intimate contact with ND surfaces, the high energy electron or proton beam used for irradiating the particles may promote knock-on such that the element is incorporated into the diamond crystalline lattice. The MeV beam energies used for irradiations are substantially above the knock-on displacement threshold. Experimentally this can be realized using at least two approaches to bring N into intimate contact with the ND particle surfaces. In the first approach, FND containing surface groups enriched with N (for example, amino groups) can be irradiated with electrons or protons with the assumption that some N residing on the diamond surface is introduced into the diamond lattice providing an source of N leading to additional NV centers formation. Alternatively, nitrogen can be just adsorbed on ND surfaces before irradiation. A pellet can be formed using a hydraulic press from a N-rich matrix and ND before irradiation.

In the second approach, N-rich material can be bead milled together with the ND powder, exploring the mechanical alloying approach. Mechanical alloying can be facilitated if one uses NDs with preexisting vacancies (using NDs irradiated with electrons, but not annealed in vacuum, only purified from $sp^2$ carbon). After milling, a pellet is formed from the milled material using a 10 ton Carver press followed by high temperature annealing in vacuum. In-diffusion of N atoms\ions into the diamond lattice can be possible by treatment of ND with a high vacancy concentration in a nitrogen ambient in an atmospheric pressure plasma. If this process does not form substitutional N sites, this method can enrich the surface of ND particles with N atoms, so that further processing described above can facilitate formation of substitutional N defects and eventually production of NV centers. After the ND particles are enriched with substitutional N, they undergo irradiation to create vacancies, annealed in vacuum to create NV centers and purified from $sp^2$ carbon.

Approaches outlined above (milling of irradiated ND with N-rich material, doping based on the knock-on effect, treatment of irradiated ND in a nitrogen plasma) can be combined with a goal of increasing the subsurface N content so that ultimately additional NV center production is possible. It is expected that in this approach N will be relatively uniformly distributed between different ND particles facilitating brightness uniformity. FND obtained by this approach will contain NV centers that are located in the outer part of the particles, close to the surface of the particle (e.g., within about 2-3 nm of the particle surface). The location of active NV centers close to the surface facilitates ND-NV sensing applications. This approach is likely to be more efficient for small size NDs, with larger specific surface area. Proper surface functionalization (for example, fluorination), might be useful to maintain the activity of the created centers.

Working Example 11. Production of Multicolor ND

Production of FND with multicolor emission, combining blue, green and red emission is possible. The combination of NV and Silicon-Vacancy (Si-V) emitters combining red and NIR emission within one particle can also be produced. Production of NDs with multicolor emission in the visible region can be based on N-containing defects. Incorporation of Si-V centers into N-based multicolor ND can be also an option.

Nitrogen is the most common impurity in diamond, incorporated into the crystal lattice as isolated substitutional nitrogen atoms (C centers), two nearest-neighbor substitutional nitrogen atoms (A centers), or four substitutional nitrogen atoms surrounding a vacancy (B centers), among other N-containing defects. Vacancies trapped by nitrogen atoms form different color centers, depending on the type of starting material used in the production. In addition to NV centers, another type of color center that has been produced in NDs at higher nitrogen concentrations is the H3 center. The H3 center is a nitrogen-vacancy-nitrogen complex, N—V—N, originating from the A aggregate in type Ia diamond, which typically contains about 1000 ppm of nitrogen as an impurity. When excited by blue light at its maximum absorption (470 nm), the H3 center emits green fluorescence at 531 nm. Samples of 70 nm and 140 nm Ia natural NDs (purchased from Microdiamant, Switzerland) were annealed in vacuum (850° C. for 2 hours) and purified in air (500° C. for 2 hours) that became our standard procedure for production of high quality material and then irradiated by electrons.

After electron irradiation samples were annealed (900° C. for 2 hours) and purified again. Even at a low irradiation dose of only 2.5E+18 e/cm$^2$, the 140 nm particles were more than twice as bright as a reference 140 nm sample from Academia Sinica produced by irradiation of natural NDs with He$^+$ ions. This fact emphasizes that electron irradiation is more efficient and produces less damage than irradiation with ions.

ND can also emit blue fluorescence from the N3 center. These structural defects have three nitrogen atoms surrounding a vacancy in type Ia diamond. These centers (with a zero phonon line (ZPL) at 415 nm) are often produced concurrently with the H3 centers in natural diamond. Indeed, when inspecting natural ND with bright green fluorescence using a fluorescent microscope, blue fluorescence was also observed under excitation with UV light.

N-rich 100 micron sample from Diamond Innovations, USA containing 800 ppm of N was inspected in a fluorescent microscope. The sample exhibited slight hints of red, green and blue fluorescence, indicating small content of NV, H3 and N3 defects. This sample was irradiated with electrons to increase the density of the three different centers. The emission from all three color centers was significantly increased. Micron sized diamond can be fragmented to smaller ND particles as illustrated in Example 8.

Diamond particles 15 um in size purchased from Diamond Innovations, USA, contained both C and A nitrogen centers. After irradiation with electrons (5E+18 e/cm$^2$), microdiamond particles had both very bright red and green fluorescence. Particles milled down to 40 nm sizes also exhibited both red and green fluorescence during inspection under a fluorescent microscope.

Prothetic Example 12. Production of ND with SiV Centers

An approach similar to that described in Example 10 on additional doping of ND particles with N, can be realized by additional doping of ND with Si with a goal of creating Si-V color centers. It is based on bringing Si atoms into intimate contact with ND particle surfaces and creating conditions for the in-diffusion of Si atoms to the diamond lattice. Creating a high concentration of vacancies in ND particles where Si atoms can be incorporated, might facilitate this effect.

Similar to approaches outlined in Example 10, milling of irradiated ND with Si-rich material, doping with Si based on the knock-in effect, treatment of irradiated ND in a SiH$_4$ atmospheric pressure plasma or reduced pressure plasma (other volatile silicon containing gases may be used) can be combined with a goal of increasing the subsurface Si content so that ultimately SiV center production is possible. It is expected that in this approach Si will be relatively uniformly distributed between different ND particles facilitating brightness uniformity. FND obtained by this approach will contain SiV centers that are essentially located in the outer part of the particles, closer to the surface. The location of active SiV centers close to the surface facilitates FND sensing applications.

Using processes as described above, fluorescent diamond particle can be produced which in certain implementations can be characterized by: having a surface and a diamond lattice; a particle size in the range of approximately 6 nm to 50 nm; a plurality of fluorescent color centers comprising at least one dopant atom that is combined with at least one vacancy; the particle having a region within approximately 3 nm of the surface of the particle that is enriched with fluorescent color centers; where the region has between approximately 1 ppm to 1000 ppm of color centers; and where the particle is substantially devoid of sp$^2$ carbon at the particle surface.

In addition, the fluorescent diamond surface can be functionalized, for example with carboxylic groups, hydroxyl groups, amino groups, epoxy, polyethylene glycol groups, hydrocarbon chain, hydrocarbon group, an aromatic group, a nucleophile, a thiol, a sulfur, an acid, a base, or a fluoro-containing group.

The fluorescent diamond particles can also be modified by having various materials conjugated with the diamond particles or attached to the diamond particles such as one or more of a biological molecule, a nucleic acid, a protein, an antibody, a ligand, a dye, a fluorescent specie, a radioactive specie, a paramagnetic specie, an image contrast agent, a drug molecule and a polymer.

Many variations will occur to those skilled in the art upon consideration of the present teachings.

Recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language ("e.g." or "such as" or "for example") provided herein, is intended merely to better illuminate the invention and does not pose a limitation on the scope of the invention unless otherwise explicitly claimed. No language in the specification should be construed as indicating any non-claimed element as essential to the practice of the invention.

While certain illustrative embodiments and examples have been described, it is evident that many alternatives, modifications, permutations and variations will become apparent to those skilled in the art in light of the foregoing description.

What is claimed is:

1. A method of processing diamond particles to form color centers, comprising:
   a) providing diamond particles having a surface and having a diamond lattice and containing at least one dopant;
   b) creating vacancies in the diamond particles by irradiating the diamond particles with high energy radiation;
   c) after irradiating the diamond particles, annealing the irradiated diamond particles in at least one of an inert environment and vacuum at a temperature high enough to cause the vacancies to diffuse and combine with the at least one dopant to form color centers;
   d) after annealing the irradiated diamond particles, purifying the irradiated and annealed diamond particles to remove $sp^2$ carbon from the surface of the diamond particles;
   e) repeating steps b), c) and d) at least once such that the resulting diamond particles with color centers produced using the accumulated irradiation dose have brighter fluorescent intensity than diamond particles with color centers that have been produced by irradiating in a single irradiation run followed by a single annealing and purification sequence; and
   f) functionalizing the purified diamond particles with at least one functional group selected from the groups consisting of carboxylic, hydroxyl, amino, epoxy, polyethylene glycol, hydrocarbon chain, hydrocarbon, aromatic, nucleophile, thiol, sulfur, acid, base, and fluoro-containing.

2. The method of processing diamond particles to form color centers according to claim 1, further comprising:
   a) before the first step of irradiating the diamond particles, perform annealing of the diamond particles in at least one of an inert environment and vacuum at a temperature high enough to cause the vacancies to diffuse and combine with the at least one dopant to form color centers;
   b) after annealing the diamond particles, purifying the annealed diamond particles to remove $sp^2$ carbon from the surface of the diamond particles.

3. The method of processing diamond particles to form color centers according to claim 1, where the diamond particles have size in the range of approximately 100 to 1000 nm.

4. The method of processing diamond particles to form color centers according to claim 1, where the diamond particles have size in the range of approximately 1 nm to 100 microns.

5. The method of processing diamond particles to form color centers according to claim 1, where the annealing is carried out at a temperature of approximately 850° C. to 1000° C. for a duration of approximately 1 to 3 hours.

6. The method of processing diamond particles to form color centers according to claim 5 where after the irradiation, the annealing is carried out at approximately 900° C. for approximately 2 hours.

7. The method of processing diamond particles to form color centers according to claim 1, where the purifying comprises at least one of oxidizing the $sp^2$ carbon and etching the $sp^2$ carbon using hydrogen.

8. The method of processing diamond particles to form color centers according to claim 1, where the irradiating comprises at least one of irradiating with high energy electrons, protons, ions, neutrons, gamma rays and photons.

9. The method of processing diamond particles to form color centers according to claim 1, where the irradiating comprises irradiating with electrons having energy between approximately 1 MeV and approximately 10 MeV.

10. The method of processing diamond particles to form color centers according to claim 9, where the irradiating comprises irradiating with electron currents between 15 mA and 33 mA.

11. The method of processing diamond particles to form color centers according to claim 1, further comprising while irradiating, causing the temperature of at least a portion of the diamond particles to be at least a temperature at which vacancies in the diamond particles diffuse and combine with at least one dopant to form color centers.

12. The method of processing diamond particles to form color centers according to claim 1, further comprising while irradiating, causing the temperature of at least a portion of the diamond particles to be at least a temperature at which carbon interstitials in the diamond particles diffuse resulting in annealing of interstitials sufficient to reduce lattice damage.

13. The method of processing diamond particles to form color centers according to claim 1, further comprising fragmenting the irradiated, annealed and purified diamond particles to sizes in the size range of approximately 1 nm to 100 nm, followed by purifying the fragmented particles to remove $sp^2$ carbon and metal impurities from the surface of the diamond particles.

14. The method of processing diamond particles to form color centers according to claim 13, where the fragmenting comprises dry ball milling in a salt matrix, and where the salt to diamond particle ratio exceeds approximately 2:1.

15. The method of processing diamond particles to form color centers according to claim 1, further comprising:
   after the purification, conjugating with the diamond particles or attaching to the diamond particles at least one material selected from the group consisting of biological molecules, a nucleic acid, a protein, an antibody, a ligand, a dye, a fluorescent specie, a radioactive specie, a paramagnetic specie, an image contrast agent, a drug molecule and a polymer.

16. The method of processing diamond particles to form color centers according to claim 1, further comprising:
   after the purification, sorting the diamond nanoparticles based upon at least one of brightness and size.

17. The method of processing diamond particles to form color centers according to claim 1, where the dopant is selected from the group consisting of nitrogen, a group of nitrogen atoms, silicon, chromium, nickel and cobalt.

18. The method of processing diamond particles to form color centers according to claim 1, where irradiating the diamond particles comprises placing the diamond powder on a cooling plate; dispersing the powder as uniformly as possible, and pressing the powder to reduce its fluffiness and enhance contact with the cooling plate.

19. A method of processing diamond particles to form color centers, comprising:
   a) providing diamond particles having a surface and having a diamond lattice and containing at least one dopant;

b) creating vacancies in the diamond particles by irradiating the diamond particles with high energy radiation wherein causing temperature of at least a portion of the diamond particles to be a temperature of at least approximately 500° C. such that vacancies in the diamond particles diffuse and combine with at least one dopant to form color centers, but the temperature is lower than the temperature when graphitization or burning of diamond particles occurs;

c) wherein the resulting diamond particles with color centers have higher fluorescent intensity than diamond particles with color centers that have been produced without heating during irradiation to at least approximately 500° C.

20. The method of processing diamond particles to form color centers according to claim 19 further comprising while irradiating causing temperature of at least a portion of the diamond particles to be a temperature of at least approximately 200° C. such that carbon interstitials in the diamond particles diffuse resulting in annealing of interstitials reducing lattice damage such that the resulting diamond particles with color centers are brighter than diamond particles with color centers that have been produced without heating during irradiation to at least approximately 200° C.

21. The method of processing diamond particles to form color centers according to claim 20, where the temperature of at least a portion of diamond particles is below a temperature at which vacancies start to move but higher than a temperature at which interstitials start to move and irradiated diamond particles contain at least approximately 100 ppm of vacancies and further comprising:
  a) bringing the diamond particles surfaces into intimate contact with at least one external atom corresponding to a dopant element;
  b) while irradiating, providing energy to the external dopant element for the in-diffusion into diamond lattice of at least one additional dopants;
  c) annealing the diamond particles in vacuum or inert atmosphere for formation of color centers; and
  d) purifying the annealed diamond particles to remove $sp^2$ carbon from the surface of the diamond particles.

22. The method of processing diamond particles to form color centers according to claim 21, where the diamond particles have a surface and a diamond lattice comprising:
  a) a particle size in the range of approximately 6 nm to 50 nm;
  b) a region within approximately 3 nm of the surface of the particle enriched with fluorescent color centers;
  c) where the region comprises between approximately 1 ppm to 1000 ppm of color centers; and
  d) where the particle is substantially devoid of $sp^2$ carbon at the particle surface.

23. The method of processing diamond particles to form color centers according to claim 22, where the diamond particle surface is functionalized.

24. The method of processing diamond particles to form color centers according to claim 22, where the diamond particle surface is functionalized with at least one functional group selected from the groups consisting of carboxylic, hydroxyl, amino, epoxy, polyethylene glycol, hydrocarbon chain, hydrocarbon, aromatic, nucleophile, thiol, sulfur, acid, base, and fluoro-containing.

25. The method of processing diamond particles to form color centers according to claim 22, further characterized by the diamond particles being conjugated with or attaching to the diamond particles at least one material selected from the group consisting of a biological molecule, a nucleic acid, a protein, an antibody, a ligand, a dye, a fluorescent specie, a radioactive specie, a paramagnetic specie, an image contrast agent, a drug molecule and a polymer.

26. The method of processing diamond particles to form fluorescent color centers according to claim 20, where the temperature is caused to be at least a temperature at which carbon interstitials in the diamond particles diffuse resulting in annealing of interstitials reducing lattice damage by heat generated by the high energy irradiation of the diamond particles.

27. The method of processing diamond particles to form color centers according to claim 19, where the irradiation is carried out in an air ambient with the temperature of the diamond particles being at least as high as a temperature at which the vacancies diffuse and form fluorescent color centers but not so high as to cause the diamond particles to burn in the presence of oxygen.

28. The method of processing diamond particles to form color centers according to claim 19, where the irradiation is carried out in an inert atmosphere while causing the temperature of the diamond particles to exceed a temperature at which the vacancies start to diffuse and form fluorescent color centers.

29. The method of processing diamond particles to form color centers according to claim 19, further comprising after the irradiation, annealing the diamond particles in a vacuum or an inert atmosphere at a temperature of approximately 850° C. to 1000° C. for a duration of approximately 1 to 3 hours followed by purifying the diamond particles to remove $sp^2$ carbon at the surface of the diamond particles.

30. The method of processing diamond particles to form color centers according to claim 29, where the purifying comprises at least one of oxidizing of $sp^2$ carbon and etching of $sp^2$ carbon using hydrogen.

31. The method of processing diamond particles to form fluorescent color centers according to claim 19, where the temperature is caused to be at least a temperature at which vacancies in the diamond particles diffuse to form fluorescent color centers during irradiation by heat generated by the high energy irradiation of the diamond particles.

32. The method of processing diamond particles to form fluorescent color centers according to claim 19 where the temperature is caused to be at least a temperature at which vacancies in the diamond particle diffuse to form fluorescent color centers during irradiation by heating the diamond particles using a heat source that operates independently of the source of high energy radiation.

33. A method of processing diamond particles to form color centers, comprising:
  a) providing diamond particles having a surface and having a diamond lattice and containing at least one dopant;
  b) creating vacancies in the diamond particles by irradiating the diamond particles with high energy radiation;
  c) after irradiating the diamond particles, annealing the irradiated diamond particles in at least one of an inert environment and vacuum at a temperature high enough to cause the vacancies to diffuse and combine with the at least one dopant to form color centers;
  d) after annealing the irradiated diamond particles, purifying the irradiated and annealed diamond particles to remove $sp^2$ carbon from the surface of the diamond particles;
  e) repeating steps b), c) and d) at least once such that the resulting diamond particles with color centers produced using the accumulated irradiation dose have brighter fluorescent intensity than diamond particles with color centers that have been produced by irradiating in a single irradiation run followed by a single annealing and purification sequence; and f) where irradiating the diamond particles comprises placing the diamond powder on a cooling plate; dispersing the powder as uniformly as possible, and pressing the powder to reduce its fluffiness and enhance contact with the cooling plate.

34. The method of processing diamond particles to form color centers according to claim 33, further comprising covering the powder with aluminum foil to reduce loss of the diamond powder due to air currents, and perforating the foil with small holes for gas release.

35. The method of processing diamond particles to form color centers according to claim 33, further comprising conditioning of the samples comprising irradiation at certain beam currents lower than the planned maximum electron beam current.

* * * * *